United States Patent
Krishnamurthy

(10) Patent No.: US 8,954,942 B2
(45) Date of Patent: Feb. 10, 2015

(54) OPTIMIZATIONS USING A BPEL COMPILER

(75) Inventor: Sanjay M. Krishnamurthy, Cupertino, CA (US)

(73) Assignee: Oracle International Corporation, Redwood Shores, CA (US)

(*) Notice: Subject to any disclaimer, the term of this patent is extended or adjusted under 35 U.S.C. 154(b) by 313 days.

(21) Appl. No.: 13/360,127

(22) Filed: Jan. 27, 2012

(65) Prior Publication Data

US 2013/0086568 A1    Apr. 4, 2013

Related U.S. Application Data

(60) Provisional application No. 61/541,300, filed on Sep. 30, 2011.

(51) Int. Cl.
G06F 9/45    (2006.01)
G06F 9/44    (2006.01)

(52) U.S. Cl.
CPC .............. *G06F 8/443* (2013.01); *G06F 9/4435* (2013.01)
USPC .......................................... 717/151; 717/141

(58) Field of Classification Search
CPC ....................................................... G06F 8/433
See application file for complete search history.

(56) References Cited

U.S. PATENT DOCUMENTS

| | | | | |
|---|---|---|---|---|
| 4,595,981 A | * | 6/1986 | Leung | 714/38.1 |
| 5,659,754 A | * | 8/1997 | Grove et al. | 717/158 |
| 5,790,778 A | | 8/1998 | Bush et al. | |
| 5,850,518 A | | 12/1998 | Northrup | |
| 5,946,492 A | * | 8/1999 | Bates | 717/156 |
| 6,047,332 A | | 4/2000 | Viswanathan et al. | |
| 6,078,745 A | * | 6/2000 | De Greef et al. | 717/151 |
| 6,117,180 A | | 9/2000 | Dave et al. | |
| 6,138,270 A | | 10/2000 | Hsu | |
| 6,154,877 A | * | 11/2000 | Ramkumar et al. | 717/114 |
| 6,161,219 A | * | 12/2000 | Ramkumar et al. | 717/130 |
| 6,397,254 B1 | | 5/2002 | Northrup | |
| 6,401,134 B1 | | 6/2002 | Razavi et al. | |
| 6,421,705 B1 | | 7/2002 | Northrup | |
| 6,442,751 B1 | | 8/2002 | Cocchi et al. | |
| 6,487,713 B1 | | 11/2002 | Cohen et al. | |
| 6,546,413 B1 | | 4/2003 | Northrup | |
| 6,601,233 B1 | | 7/2003 | Underwood | |
| 6,641,746 B2 | | 11/2003 | Houge | |
| 6,671,713 B2 | | 12/2003 | Northrup | |
| 6,671,746 B1 | | 12/2003 | Northrup | |
| 6,779,000 B1 | | 8/2004 | Northrup | |

(Continued)

OTHER PUBLICATIONS

Chappell et al., SOA—Ready for Primetime: The Next-Generation, Grid-Enabled Service-Oriented Architecture, published by The SOA Magazine, Sep. 3, 2007, pp. 1-10.*

(Continued)

*Primary Examiner* — Thuy Dao
*Assistant Examiner* — Zheng Wei
(74) *Attorney, Agent, or Firm* — Kilpatrick Townsend & Stockton LLP

(57) ABSTRACT

Various arrangements for reducing a size of a Business Process Execution Language (BPEL) data blob for storage may be presented. One or more dehydration points within compiled BPEL code may be identified. A liveness analysis for the one or more dehydration points may be performed. At each of the one or more dehydration points, one or more live variables from a set of variables may be identified. An optimization data structure may be created for each dehydration point identifies the one or more live variables.

14 Claims, 10 Drawing Sheets

(56) References Cited

U.S. PATENT DOCUMENTS

| | | | |
|---|---|---|---|
| 6,807,636 | B2 | 10/2004 | Hartman et al. |
| 6,901,580 | B2 | 5/2005 | Iwanojko et al. |
| 6,922,675 | B1 | 7/2005 | Chatterjee et al. |
| 6,922,705 | B1 | 7/2005 | Northrup |
| 6,947,992 | B1 | 9/2005 | Shachor |
| 6,954,792 | B2 | 10/2005 | Kang et al. |
| 6,973,460 | B1* | 12/2005 | Mitra ............................. 1/1 |
| 6,990,532 | B2 | 1/2006 | Day et al. |
| 7,028,019 | B2 | 4/2006 | McMillan et al. |
| 7,062,749 | B2 | 6/2006 | Cyr et al. |
| 7,086,009 | B2 | 8/2006 | Resnick et al. |
| 7,117,216 | B2 | 10/2006 | Chakraborty et al. |
| 7,146,607 | B2* | 12/2006 | Nair et al. ............... 717/151 |
| 7,177,878 | B2* | 2/2007 | Wason ............................ 1/1 |
| 7,188,158 | B1 | 3/2007 | Stanton et al. |
| 7,203,938 | B2 | 4/2007 | Ambrose et al. |
| 7,263,686 | B2 | 8/2007 | Sadiq |
| 7,343,360 | B1 | 3/2008 | Ristanovic et al. |
| 7,349,913 | B2 | 3/2008 | Clark et al. |
| 7,505,990 | B2 | 3/2009 | Krishna et al. |
| 7,535,927 | B1 | 5/2009 | Northrup |
| 7,536,606 | B2 | 5/2009 | Andrews et al. |
| 7,555,712 | B2 | 6/2009 | Croft et al. |
| 7,584,207 | B2 | 9/2009 | Mortensen et al. |
| 7,590,644 | B2 | 9/2009 | Matsakis et al. |
| 7,603,674 | B2 | 10/2009 | Cyr et al. |
| 7,644,262 | B1 | 1/2010 | Bromley et al. |
| 7,680,752 | B1* | 3/2010 | Clune et al. ............... 706/45 |
| 7,685,604 | B2* | 3/2010 | Baartman et al. ......... 719/313 |
| 7,693,851 | B2 | 4/2010 | Becker |
| 7,721,158 | B2 | 5/2010 | Lee |
| 7,774,477 | B2 | 8/2010 | Zintel et al. |
| 7,783,782 | B2 | 8/2010 | Cromp et al. |
| 7,788,338 | B2 | 8/2010 | Savchenko et al. |
| 7,793,340 | B2 | 9/2010 | Kiester et al. |
| 7,827,494 | B1 | 11/2010 | Hedayatpour et al. |
| 7,840,941 | B2 | 11/2010 | Brookins et al. |
| 7,853,899 | B1 | 12/2010 | Damaschke et al. |
| 7,865,544 | B2 | 1/2011 | Kordun et al. |
| 7,895,512 | B2 | 2/2011 | Roberts |
| 7,933,946 | B2 | 4/2011 | Livshits et al. |
| 7,945,907 | B2 | 5/2011 | Dreiling et al. |
| 7,950,424 | B2 | 5/2011 | Ozanne et al. |
| 7,954,111 | B2* | 5/2011 | Waguet ..................... 719/318 |
| 7,984,424 | B2 | 7/2011 | Dengler et al. |
| 7,992,130 | B2 | 8/2011 | Bozza et al. |
| 8,015,545 | B2 | 9/2011 | Seto et al. |
| 8,032,390 | B2* | 10/2011 | Waguet ..................... 705/1.1 |
| 8,065,668 | B2* | 11/2011 | Bosworth et al. ......... 717/141 |
| 8,074,214 | B2 | 12/2011 | Isaacson et al. |
| 8,108,825 | B2 | 1/2012 | Goodwin et al. |
| 8,122,292 | B2* | 2/2012 | Nanjundaswamy ......... 714/34 |
| 8,141,064 | B2* | 3/2012 | Chipman ................... 717/154 |
| 8,166,450 | B2* | 4/2012 | Fuhler et al. .............. 717/101 |
| 8,196,125 | B2* | 6/2012 | Maes ......................... 717/151 |
| 8,209,672 | B2* | 6/2012 | Ivanov ....................... 717/136 |
| 8,209,675 | B2 | 6/2012 | Zhao et al. |
| 8,271,609 | B2 | 9/2012 | Addala et al. |
| 8,332,654 | B2 | 12/2012 | Anbuselvan |
| 8,423,973 | B2* | 4/2013 | Saunders et al. .......... 717/130 |
| 8,494,832 | B2* | 7/2013 | Krishnan et al. ............ 703/22 |
| 8,538,998 | B2 | 9/2013 | Barrow |
| 8,555,266 | B2* | 10/2013 | Copeland et al. ......... 717/151 |
| 8,560,938 | B2 | 10/2013 | Barrow et al. |
| 8,601,454 | B2* | 12/2013 | Christophe ................ 717/151 |
| 8,667,031 | B2 | 3/2014 | Konduri et al. |
| 8,782,604 | B2 | 7/2014 | Konduri et al. |
| 8,788,542 | B2 | 7/2014 | Barrow |
| 8,799,319 | B2 | 8/2014 | Srinivasan et al. |
| 8,856,737 | B2 | 10/2014 | Kand et al. |
| 8,869,108 | B2 | 10/2014 | Utschig-Utschig et al. |
| 2002/0013938 | A1* | 1/2002 | Duesterwald et al. ......... 717/9 |
| 2002/0023140 | A1 | 2/2002 | Hile et al. |
| 2002/0103660 | A1 | 8/2002 | Cramon et al. |
| 2002/0129060 | A1 | 9/2002 | Rollins et al. |
| 2002/0133515 | A1 | 9/2002 | Kagle et al. |
| 2002/0143735 | A1 | 10/2002 | Ayi et al. |
| 2002/0147757 | A1 | 10/2002 | Day et al. |
| 2002/0188613 | A1 | 12/2002 | Chakraborty et al. |
| 2003/0005117 | A1 | 1/2003 | Kang et al. |
| 2003/0023587 | A1 | 1/2003 | Dennis et al. |
| 2003/0025732 | A1 | 2/2003 | Prichard |
| 2003/0033310 | A1 | 2/2003 | Factor et al. |
| 2003/0034989 | A1 | 2/2003 | Kondo |
| 2003/0074653 | A1* | 4/2003 | Ju et al. ..................... 717/154 |
| 2003/0084424 | A1 | 5/2003 | Reddy et al. |
| 2003/0088857 | A1 | 5/2003 | Salva et al. |
| 2003/0172127 | A1 | 9/2003 | Northrup |
| 2003/0172168 | A1 | 9/2003 | Mak et al. |
| 2003/0172193 | A1 | 9/2003 | Olsen |
| 2003/0192031 | A1 | 10/2003 | Srinivasan et al. |
| 2003/0204518 | A1 | 10/2003 | Lang et al. |
| 2003/0204645 | A1 | 10/2003 | Sharma et al. |
| 2003/0233631 | A1 | 12/2003 | Curry et al. |
| 2003/0233642 | A1 | 12/2003 | Hank |
| 2004/0046787 | A1 | 3/2004 | Henry et al. |
| 2004/0046789 | A1 | 3/2004 | Inanoria |
| 2004/0054991 | A1 | 3/2004 | Harres |
| 2004/0073565 | A1 | 4/2004 | Kaufman et al. |
| 2004/0078424 | A1 | 4/2004 | Yairi et al. |
| 2004/0111533 | A1 | 6/2004 | Beisiegel et al. |
| 2004/0111673 | A1 | 6/2004 | Bowman et al. |
| 2004/0148588 | A1 | 7/2004 | Sadiq |
| 2004/0181534 | A1 | 9/2004 | Mortensen et al. |
| 2004/0194016 | A1 | 9/2004 | Liggitt |
| 2004/0205117 | A1 | 10/2004 | Hertling et al. |
| 2004/0205765 | A1 | 10/2004 | Beringer et al. |
| 2004/0216094 | A1* | 10/2004 | Bosworth et al. ......... 717/141 |
| 2004/0230639 | A1 | 11/2004 | Soluk et al. |
| 2004/0261066 | A1* | 12/2004 | Ringseth et al. .......... 717/141 |
| 2005/0044197 | A1 | 2/2005 | Lai |
| 2005/0050527 | A1* | 3/2005 | McCrady et al. .......... 717/141 |
| 2005/0091639 | A1 | 4/2005 | Patel |
| 2005/0097503 | A1* | 5/2005 | Zintel et al. ................ 717/100 |
| 2005/0183074 | A1 | 8/2005 | Alexander et al. |
| 2005/0193061 | A1 | 9/2005 | Schmidt et al. |
| 2005/0223361 | A1 | 10/2005 | Belbute |
| 2005/0240858 | A1 | 10/2005 | Croft et al. |
| 2005/0251788 | A1 | 11/2005 | Henke et al. |
| 2005/0273772 | A1 | 12/2005 | Matsakis et al. |
| 2006/0010163 | A1 | 1/2006 | Herzog et al. |
| 2006/0015847 | A1 | 1/2006 | Carroll, Jr. |
| 2006/0031264 | A1* | 2/2006 | Bosworth et al. ......... 707/200 |
| 2006/0031750 | A1 | 2/2006 | Waldorf et al. |
| 2006/0036463 | A1 | 2/2006 | Patrick et al. |
| 2006/0075387 | A1 | 4/2006 | Martin et al. |
| 2006/0080117 | A1 | 4/2006 | Carr et al. |
| 2006/0101038 | A1 | 5/2006 | Gabriel et al. |
| 2006/0106626 | A1 | 5/2006 | Jeng et al. |
| 2006/0117073 | A1* | 6/2006 | Bosworth et al. ......... 707/201 |
| 2006/0130047 | A1 | 6/2006 | Burugapalli |
| 2006/0136832 | A1 | 6/2006 | Keller et al. |
| 2006/0143229 | A1 | 6/2006 | Bou-Ghannam et al. |
| 2006/0150156 | A1 | 7/2006 | Cyr et al. |
| 2006/0165105 | A1 | 7/2006 | Shenfield et al. |
| 2006/0168132 | A1 | 7/2006 | Bunter et al. |
| 2006/0168355 | A1 | 7/2006 | Shenfield et al. |
| 2006/0168557 | A1 | 7/2006 | Agrawal et al. |
| 2006/0184866 | A1 | 8/2006 | Rees |
| 2006/0206858 | A1 | 9/2006 | Becker et al. |
| 2006/0235733 | A1 | 10/2006 | Marks |
| 2006/0235986 | A1 | 10/2006 | Kim |
| 2006/0242636 | A1 | 10/2006 | Chilimbi et al. |
| 2006/0253490 | A1 | 11/2006 | Krishna et al. |
| 2006/0265702 | A1 | 11/2006 | Isaacson et al. |
| 2006/0271537 | A1 | 11/2006 | Chandrasekharan et al. |
| 2006/0277542 | A1 | 12/2006 | Wipfel |
| 2006/0282767 | A1 | 12/2006 | Suryanarayana et al. |
| 2006/0294474 | A1 | 12/2006 | Taylor et al. |
| 2006/0294506 | A1 | 12/2006 | Dengler et al. |
| 2007/0016429 | A1 | 1/2007 | Bournas et al. |
| 2007/0055936 | A1 | 3/2007 | Dhanjal et al. |
| 2007/0106975 | A1 | 5/2007 | Deline |
| 2007/0113191 | A1 | 5/2007 | Keller et al. |

(56) References Cited

U.S. PATENT DOCUMENTS

| | | | |
|---|---|---|---|
| 2007/0130205 A1 | 6/2007 | Dengler et al. | |
| 2007/0157078 A1 | 7/2007 | Anderson | |
| 2007/0169199 A1 | 7/2007 | Quinnell et al. | |
| 2007/0174763 A1 | 7/2007 | Chang et al. | |
| 2007/0174822 A1 | 7/2007 | Moser et al. | |
| 2007/0203956 A1 | 8/2007 | Anderson et al. | |
| 2007/0220429 A1 | 9/2007 | Kureshy et al. | |
| 2007/0240096 A1 | 10/2007 | Pontoppidan et al. | |
| 2007/0245340 A1 | 10/2007 | Cohen et al. | |
| 2007/0260575 A1* | 11/2007 | Robinson et al. | 707/1 |
| 2007/0266377 A1* | 11/2007 | Ivanov | 717/136 |
| 2007/0271552 A1 | 11/2007 | Pulley | |
| 2007/0277095 A1 | 11/2007 | Ukigawa | |
| 2007/0282885 A1 | 12/2007 | Baude et al. | |
| 2007/0294586 A1 | 12/2007 | Parvathy et al. | |
| 2007/0294664 A1 | 12/2007 | Joshi | |
| 2008/0004887 A1 | 1/2008 | Brunswig et al. | |
| 2008/0022257 A1* | 1/2008 | Baartman et al. | 717/106 |
| 2008/0028302 A1 | 1/2008 | Meschkat | |
| 2008/0065675 A1 | 3/2008 | Bozich et al. | |
| 2008/0077848 A1 | 3/2008 | Roberts | |
| 2008/0083012 A1 | 4/2008 | Yu et al. | |
| 2008/0104617 A1 | 5/2008 | Apacible et al. | |
| 2008/0120557 A1 | 5/2008 | Offenhartz et al. | |
| 2008/0126396 A1 | 5/2008 | Gagnon | |
| 2008/0127087 A1 | 5/2008 | Brookins et al. | |
| 2008/0127124 A1 | 5/2008 | Gilfix et al. | |
| 2008/0162208 A1* | 7/2008 | Waguet | 705/7 |
| 2008/0162304 A1 | 7/2008 | Ourega | |
| 2008/0162565 A1* | 7/2008 | Waguet | 707/104.1 |
| 2008/0163164 A1 | 7/2008 | Chowdhary et al. | |
| 2008/0183479 A1 | 7/2008 | Iwashita et al. | |
| 2008/0183744 A1 | 7/2008 | Adendorff et al. | |
| 2008/0184201 A1 | 7/2008 | Burns et al. | |
| 2008/0189358 A1 | 8/2008 | Charles | |
| 2008/0189617 A1 | 8/2008 | Covell et al. | |
| 2008/0196024 A1 | 8/2008 | Barfield et al. | |
| 2008/0243901 A1 | 10/2008 | Super et al. | |
| 2008/0250313 A1 | 10/2008 | Kamdar et al. | |
| 2008/0275844 A1 | 11/2008 | Buzsaki et al. | |
| 2008/0276218 A1 | 11/2008 | Taylor et al. | |
| 2008/0276260 A1 | 11/2008 | Garlick et al. | |
| 2008/0295109 A1 | 11/2008 | Huang et al. | |
| 2008/0313648 A1 | 12/2008 | Wang et al. | |
| 2008/0320246 A1* | 12/2008 | Fuhler et al. | 711/154 |
| 2009/0031280 A1 | 1/2009 | Koehler | |
| 2009/0083297 A1 | 3/2009 | Pohl et al. | |
| 2009/0089741 A1* | 4/2009 | Bornhoevd et al. | 717/106 |
| 2009/0094588 A1* | 4/2009 | Chipman | 717/141 |
| 2009/0106494 A1 | 4/2009 | Knebel | |
| 2009/0125893 A1* | 5/2009 | Copeland et al. | 717/151 |
| 2009/0144716 A1 | 6/2009 | Felts | |
| 2009/0144729 A1 | 6/2009 | Guizar | |
| 2009/0150565 A1 | 6/2009 | Grossner et al. | |
| 2009/0157859 A1 | 6/2009 | Morris | |
| 2009/0158237 A1 | 6/2009 | Zhang et al. | |
| 2009/0158263 A1* | 6/2009 | Christophe | 717/154 |
| 2009/0178020 A1 | 7/2009 | Goodwin et al. | |
| 2009/0204567 A1 | 8/2009 | Barrow | |
| 2009/0204629 A1 | 8/2009 | Barrow | |
| 2009/0204884 A1 | 8/2009 | Barrow et al. | |
| 2009/0204943 A1 | 8/2009 | Konduri | |
| 2009/0205013 A1 | 8/2009 | Lowes | |
| 2009/0217153 A1 | 8/2009 | Oshima et al. | |
| 2009/0259993 A1 | 10/2009 | Konduri et al. | |
| 2009/0292797 A1 | 11/2009 | Cromp et al. | |
| 2009/0313256 A1 | 12/2009 | Konduri et al. | |
| 2009/0320007 A1* | 12/2009 | Krishnaswamy et al. | 717/151 |
| 2010/0057482 A1 | 3/2010 | Radhakrishnan et al. | |
| 2010/0057836 A1 | 3/2010 | Anbulselvan | |
| 2010/0070553 A1 | 3/2010 | Addala et al. | |
| 2010/0070973 A1 | 3/2010 | Addala et al. | |
| 2010/0082556 A1 | 4/2010 | Srinivasan et al. | |
| 2010/0131937 A1* | 5/2010 | Misra et al. | 717/151 |
| 2010/0132009 A1 | 5/2010 | Khemani et al. | |
| 2010/0146291 A1 | 6/2010 | Anbuselvan | |
| 2010/0162220 A1* | 6/2010 | Cui et al. | 717/155 |
| 2010/0236660 A1 | 9/2010 | Ozanne et al. | |
| 2010/0313038 A1 | 12/2010 | Bradley | |
| 2010/0332401 A1* | 12/2010 | Prahlad et al. | 705/80 |
| 2010/0332454 A1* | 12/2010 | Prahlad et al. | 707/654 |
| 2010/0333116 A1* | 12/2010 | Prahlad et al. | 719/328 |
| 2011/0010692 A1* | 1/2011 | Hattori et al. | 717/132 |
| 2011/0023071 A1 | 1/2011 | Li et al. | |
| 2011/0047415 A1* | 2/2011 | Nanjundaswamy | 714/37 |
| 2011/0119649 A1 | 5/2011 | Kand et al. | |
| 2011/0119651 A1 | 5/2011 | Utschig-Utschig et al. | |
| 2011/0282829 A1* | 11/2011 | Rangaswamy et al. | 707/608 |
| 2012/0116980 A1* | 5/2012 | Mercuri | 705/301 |
| 2012/0296624 A1* | 11/2012 | Jeng et al. | 703/22 |
| 2013/0024424 A1* | 1/2013 | Prahlad et al. | 707/640 |
| 2013/0086568 A1* | 4/2013 | Krishnamurthy | 717/154 |
| 2014/0081896 A1* | 3/2014 | Ranganathan et al. | 706/48 |
| 2014/0282602 A1 | 9/2014 | Addala et al. | |

OTHER PUBLICATIONS

Oracle BPEL 10g Purging Strategies, An Oracle White Paper, Aug. 2010, published by Oracle, pp. 1-21.*

Oracle SOA Suite 11g: Essential Concepts, vol. I—Stufent Guide, Edtition 1.0 published by Oracle, Sep. 2010, pp. 8-18-8-21.*

Bohn et al., WS-BPEL Process Compiler for REsource-Constrained Embedded Systems, published by IEEE, 2008, pp. 1387-1392.*

U.S. Appl. No. 12/029,605, Notice of Allowance mailed on Mar. 3, 2014, 9 pages.

U.S. Appl. No. 12/212,599, Notice of Allowance mailed on Feb. 7, 2014, 5 pages.

U.S. Appl. No. 12/487,004, Final Office Action mailed on Dec. 27, 2013, 18 pages.

U.S. Appl. No. 12/487,004, Notice of Allowance mailed on Mar. 6, 2014, 5 pages.

U.S. Appl. No. 12/790,437, Non-Final Office Action mailed on Dec. 30, 2013, 15 pages.

U.S. Appl. No. 12/790,445, Non-Final Office Action mailed on Dec. 31, 2013, 13 pages.

Chen et. al., Feature Analysis for Service-Oriented Reengineering, IEEE 12th Asia-Pacific Software Engineering Conference (APSEC 2005), Dec. 2005, Taipei, Taiwan.

Dynamic Structure in ADF UIX Pages, from Oracle ADF UIX Developer's Guide, Copyright 2001, 2004 Oracle, downloaded on Mar. 7, 2012 from http://download.oracle.com/otn_hosted _doc/jdeveloper/1012/uixhelp/uixdevguide/dynamic.html., 11 pages.

"Client-Server Modernization—From Oracle® Forms to Java," VGO Software Products, Copyright 2009 Vgo Software Inc., printed on Aug. 28, 2009, downloaded from URL;http://www.vgosoftware.com/products/evo/index.php, 2 pages.

"Vgo Software First to Convert Oracle Forms to Oracle ADF V11"; VGO News, Sep. 16, 2008, downloaded on Aug. 28, 2009 from URL: http://vgosoftware.com/about/news/view_article.php?new_id=35 , 2 pages.

"Oracle Forms to Java Modernization" printed on Aug. 28, 2009, at URL:http://www.vgosoftware.com/products/evo/walkthrough.php; VGO Software Information printed 5 pages.

CipherSoft Inc. "Exodus-Main Features Benefits" Products: at URL: http://www.ciphersoftinc.com/products/expdus-features-benefits.html; printed on Aug. 28, 2009, 3 pages.

CipherSoft Inc. "Exodus™ Products," printed on Aug. 28, 2009, at URL: http://www.ciphersoftinc.com/products/migration-products-overview.html: 3 pages.

Shepherd, et al., "Oracle SCA—The Power of the Composite," An Oracle White Paper, Aug. 2009, Oracle, pp. 1-19, 19 pages.

Chappell, "Introducing SCA," David Chappell & Associates, Jul. 2007, pp. 1-22, 22 pages.

Chapman, et al., "SCA Service Component Architecture—Client and Implementation Model Specification for WS-BPEL," Mar. 21, 2007, SCA version 1.00, 15 pages, BEA Systems, Inc.

Beisiegel, et al., "SCA Service Component Architecture—Assembly Model Specification," Mar. 15, 2007, SCA version 1.00, 91 pages, BEA Systems, Inc.

(56) References Cited

OTHER PUBLICATIONS

"Business Process Language (BPEL) and Oracle BPEL Process Manager," Oracle FAQ, updated Jun. 26, 2004, printed on Nov. 11, 2009, at URL:http://www.oracle.com/technology/products/ias/bpel/htdocs/orabpel_faq.html?_template=. . . , 3 pages.

Zhang, et al., "Schema Based XML Security: RBAC Approach," Machine Simulator, Third International Conference on Computer Assisted Learning, Pubiished 2003, at URL:http://citeseerx.ist.psu.edu/viewdoc/summary?doi=10.1.1.3.6016, pp. 1-15, 15 pages.

Smith, Portals: Toward an Application Framework for Interoperability,: Communications of the ACM, Oct. 2004, vol. 47, No. 10, pp. 93-97 , 5 pages.

Phanouriou, "UIML: A Device-Independent User Interface Markup Language," Doctoral Dissertation, Virginia Polytechnic Institute and State University, Sep. 26, 2000, 172 pages.

"File and Registry Virtualization—the good, the bad, and the ugly," Jerry's Incoherent Babbling: Windows Connected Blog, Published Dec. 19, 2005: at URL:http://windowsconnected.com/blogs/jerry/archive/2005/12/19/file-and-registry-virtualization-the-good-the-bad-and-t. . . , 6 pages.

Hildebrandt, G., "Web-based Document Management", Apr. 2001, 22 pages.

Shang-Pin Ma,"Discovery-Based Service Composition,"National Central University, Doctoral Dissertation. Jan. 2007, 109 pages.

Yang et al., "Web Component: A Substrate for Web Service Reuse and Composition", Proc. 14th Conf. Advanced Information Systems Eng. (CAISE 02), LNCS 2348, Springer-Verlag, 2002, 16 pages.

"AJAX & Security: Vulnerability in DWR Security Logic Indentified Can Potentially be exploited to launce DoS attacks and break into back-end servers", published Jan. 8, 2007, AjaxWorld™ Magazine, pp. 1-4 downloaded on Oct. 6, 2008 from http:///ajax.sys-con.com/node/319868, 4 pages.

"Direct Web Remoting, About DWR's Javascript Security", 4 pages downloaded from http://directwebremoting.org/dwr/security/script-tag-protection on Oct. 6, 2008.

"Direct Web Remoting, DWR version 2—New and Noteworthy", 4 pages downloaded from http://directwebremoting.org/dwr/changelog/dwr20 on Dec. 5, 2008.

"Direct Web Remoting, DWR: Easy AJAX for JAVA", 2 pages downloaded from http://directwebremoting.org/dwr/overview/dwr on Oct. 6, 2008.

"Direct Web Remoting, Safari, GET and Request Forgery", 1 page downloaded from http://directwebremoting.org/dwr/security/allowGetForSafariButMakeForgeryEasier on Oct. 6, 2008.

"Direct Web Remoting, Security", 4 pages downloaded from http://directwebremoting.org/dwr/security on Oct. 6, 2008.

"Google Web Toolkit, Product Overview", 3 pages downloaded from http://code.google.com/webtoolkit/overview.html on Oct. 6, 2008.

"Oracle Application Framework", Oracle, Dec. 2006, pp. 1-242, 242 pages.

Altenhofen et al., "ASMs in Service Oriented Architectures", Journal of Universal Computer Science, vol. 14, No. 12, 2008, 25 pages.

Box et al., "Web Services Addressing (WS-Addressing)" Aug. 10, 2004, 23 pages, http://www.w3.org/Submission/ws-addressing/#_Toc77464317, printed on Aug. 18, 2009, 23 pages.

Carey, "Making BPEL Processes Dynamic" Oracle Technology Network, 8 pages, printed on Aug. 18, 2009, 8 pages.

Claypool et al., "Optimizing Performance of Schema Evolution Sequences", Objects and Databases [online], 2000 [retrieved Feb. 7, 2012], retrieved from Internet: http://se-pubs.dbs.uni-leipzig.de/files/Claypol2000OptimizingPerformanceofSchemaEvolutionSequences.pdf, pp. 114-127, 14 pages.

Curphey et al., "Web Application Security Assessment Tools", IEEE, 2006, pp. 32-41, 10 pages.

DiPaola et al., "Subverting Ajax", Dec. 2006, 23rd CCC Conference, pp. 1-8, 8 pages.

Hohpe et al., "Messaging Systems" Enterprise Integration Patterns 2004, pp. 57-97, Chapter 3, Pearson Education, Inc, Boston, Massachusetts, 45 pages.

Mietzner, et al., "Defining Composite Configurable SaaS Application Packages Using SCA Variability Descriptors and Multi-Tenancy Patters,", 2008, pp. 156-161.

Nagappan et al., "XML Processing and Data Binding with Java APIs" in: Developing Java Web Services: Architecting and Developing Secure Web Services Using Java [online], 2003 [retrieved Feb. 7, 2012], retrieved from Internet. http://java.sun.com/developer/Books/j2ee/devjws/, pp. 313-399, 89 pages.

Phillips, Josh. Window's Connected UseriD: Jerry. Jerry's Incoherent Babbling: "File and Registry Virtualization—the good, the bad, and the ugly", <http:/ /wi ndowsco n nected. co m/b logs/jerry/archive/2005/ 12/1 9/fi l e-and-reg istry-vi rtual izatio n-th e-good-th ebad-and-the-ugly.aspx>. Published: Dec. 19, 2005.

Steinberg, "Data Binding with JAXB"[online], 2003 [retrieved Feb. 7, 2012], retrieved from Internet: https://www6.software.ibm.com/developerworks/education/x-jabx/x-jaxb-a4.pdf, pp. 1-34, 34 pages.

Non-Final Office Action for U.S. Appl. No. 12/029,600 mailed on Apr. 21, 2011, 29 pages.

Non-Final Office Action for U.S. Appl. No. 12/029,605 mailed on Jul. 20, 2011, 12 pages.

Non-Final Office Action for U.S. Appl. No. 12/029,605 mailed May 12, 2010, 10 pages.

Final Office Action for U.S. Appl. No. 12/029,605 mailed on Sep. 28, 2010, 13 pages.

Non-Final Office Action for U.S. Appl. No. 12/029,609 mailed on May 26, 2010, 14 pages.

Final Office Action for U.S. Appl. No. 12/029,609 mailed on Oct. 13, 2010, 13 pages.

Non-Final Office Action for U.S. Appl. No. 12/203,816 mailed Sep. 2, 2010, 16 pages.

Final Office Action for U.S. Appl. No. 12/203,816 mailed on Jan. 20, 2011, 23 pages.

Non-Final Office Action for U.S. Appl. No. 12/203,816 mailed on Oct. 26, 2012 30 pages.

Non-Final Office Action for U.S. Appl. No. 12/029,724 mailed on Dec. 14, 2010, 21 pages.

Final Office Action for U.S. Appl. No. 12/029,724 mailed May 5, 2011, 19 pages.

Non-Final Office Action for U.S. Appl. No. 12/029,724 mailed on Jan. 7, 2013, 39 pages.

Final Office Action for U.S. Appl. No. 12/029,724 mailed on Apr. 30, 2013, 33 pages.

Non-Final Office Action for U.S. Appl. No. 12/138,997 mailed on Jun. 24, 2011, 14 pages.

Non-Final Office Action for U.S. Appl. No. 12/101,420 mailed on Oct. 5, 2011, 18 pages.

Final Office Action for U.S. Appl. No. 12/029,600 mailed on Oct. 19, 2011, 20 pages.

Terminal Disclaimer—Approved for U.S. Appl. No. 12/029,600 mailed on Oct. 25, 2011, 1 page.

Non-Final Office Action for U.S. Appl. No. 12/029,600 mailed on Sep. 17, 2012, 38 pages.

Notice of Allowance for U.S. Appl. No. 12/029,600 mailed on Nov. 7, 2012, 16 pages.

Notice of Allowance for U.S. Appl. No. 12/029,600 mailed on Feb. 5, 2013, 16 pages.

Final Office Action for U.S. Appl. No. 12/029,605 mailed on Nov. 2, 2011, 13 pages.

Non-Final Office Action for U.S. Appl. No. 12/029,605 mailed on Apr. 10, 2013, 38 pages.

Final Office Action for U.S. Appl. No. 12/029,609 mailed on Nov. 8, 2011, 13 pages.

Non-Final Office Action for U.S. Appl. No. 12/029,609 mailed on Jul. 28, 2011, 29 pages.

Notice of Allowance for U.S. Appl. No. 12/029,609 mailed on Feb. 4, 2013, 52 pages.

Final Office Action for U.S. Appl. No. 12/138,997 mailed on Dec. 5, 2011, 13 pages.

Non-Final Office Action for U.S. Appl. No. 12/487,004 mailed on Sep. 28, 2011, 29 pages.

Non-Final Office Action for U.S. Appl. No. 12/210,657 mailed on Apr. 25, 2011, 21 pages.

(56) References Cited

OTHER PUBLICATIONS

Non-Final Office Action for U.S. Appl. No. 12/210,657 mailed on Sep. 30, 2011, 21 pages.
Non-Final Office Action for U.S. Appl. No. 12/212,599 mailed on Dec. 22, 2011, 10 pages.
Non-Final Office Action for U.S. Appl. No. 12/212,599 mailed on Aug. 2, 2012, 18 pages.
Non-Final Office Action for U.S. Appl. No. 12/330,008 mailed on Dec. 21, 2011, 14 pages.
Non-Final Office Action for U.S. Appl. No. 12/029,615 mailed on Feb. 15, 2012, 27 pages.
Final Office Action for U.S. Appl. No. 2/101,420 mailed on Feb. 24, 2012, 20 pages.
Final Office Action for U.S. Appl. No. 12/487,004 mailed on Mar. 19, 2012, 30 pages.
Advisory Action for U.S. Appl. No. 12/487,004 mailed on May 24, 2012, 5 pages.
Final Office Action for U.S. Appl. No. 12/210,657 mailed on Apr. 3, 2012, 23 pages.
Final Office Action for U.S. Appl. No. 12/330,008 mailed on Apr. 10, 2012, 13 pages.
Notice of Allowance for U.S. Appl. No. 12/330,008 mailed on Jun. 11, 2012, 7 pages.
Notice of Allowance for U.S. Appl. No. 12/210,657 mailed Jun. 26, 2012, 6 pages.
Final Office Action for U.S. Appl. No. 12/029,615 mailed on Jul. 31, 2012, 33 pages.
Advisory Action for U.S. Appl. No. 12/029,615 mailed on Oct. 16, 2012, 5 pages.
Notice of Allowance for U.S. Appl. No. 12/330,008 mailed on Aug. 7, 2012, 17 pages.
Non-Final Office Action for U.S. Appl. No. 12/790,437 mailed on Jan. 30, 2013, 31 pages.
Non-Final Office Action for U.S. Appl. No. 12/790,445 mailed on Dec. 19, 2012, 30 pages.
Claessens, J. et al., "A Tangled World Web of Security Issues." First Monday vol. 7, No. 3-4, (Mar. 2002): 24 pages, Web. Jun. 25, 2013.
Final Office Action for U.S. Appl. No. 12/23,816 mailed on Jul. 5, 2013, 25 pages.
Notice of Allowance for U.S. Appl. No. 12/029,600 mailed on Jun. 11, 2013, 10 pages.
Notice of Allowance for U.S. Appl. No. 12/029,609 mailed on May 29, 2013, 14 pages.
Notice of Allowance for U.S. Appl. No. 12/212,599 mailed on Jun. 19, 2013, 6 pages.
Final Office Action for U.S. Appl. No. 12/790,437 mailed on Jul. 12, 2013, 12 pages.
Final Office Action for U.S. Appl. No. 12/790,445 mailed on Jul. 5, 2013, 10 pages.
U.S. Appl. No. 12/029,605, Final Office Action mailed on Sep. 6, 2013, 19 pages.
U.S. Appl. No. 12/029,605, Final Office Action mailed on Dec. 18, 2013, 4 pages.
U.S. Appl. No. 12/101,420, Notice of Allowance mailed on Aug. 28, 2013, 9 pages.
U.S. Appl. No. 12/138,997, Notice of Allowance mailed on Nov. 27, 2013, 13 pages.
U.S. Appl. No. 12/203,816, Advisory Action mailed on Aug. 15, 2013, 3 pages.
U.S. Appl. No. 12/212,599, Corrected Notice of Allowance mailed on Oct. 2, 2013, 4 pages.
U.S. Appl. No. 12/487,004, Non Final Office Action mailed on Sep. 24, 2013, 22 pages.
Cetin et al., A mashup-based strategy for migration to service-oriented computing, IEEE International Conference on Pervasive Services, IEEE, Jul. 20, 2007.
Li et al., Leveraging legacy codes to distributed problem-solving environments: a Web services approach, Software: Practice and experience, vol. 34, No. 13, 2004, pp. 1297-1309.
Li et al., SGrid: a service-oriented model for the Semantic Grid, Future Generation Computer Systems, vol. 20, No. 1, 2004, pp. 7-18.
Sneed et al., Integrating legacy software into a service oriented architecture, Software Maintenance and Reengineering, CSMR, IEEE, 2006.
U.S. Appl. No. 12/029,605, Notice of Allowability mailed on May 28, 2014, 2 pages.
U.S. Appl. No. 12/029,615, Notice of Allowance mailed on Oct. 2, 2014, 16 pages.
U.S. Appl. No. 12/029,724, Advisory Action mailed on Aug. 12, 2013, 2 pages.
U.S. Appl. No. 12/212,599, Corrected Notice of Allowability mailed on Sep. 25, 2014, 3 pages.
U.S. Appl. No. 12/212,599, Notice of Allowance mailed on Jul. 15, 2014, 5 pages.
U.S. Appl. No. 12/487,004, Notice of Allowability mailed on Jun. 16, 2014, 2 pages.
U.S. Appl. No. 12/790,437, Supplemental Notice of Allowability mailed on Aug. 13, 2014, 2 pages.
Vesperman, Essential CVS, O'Reilly Media Inc., Jun. 9, 2003, 80 pages.
U.S. Appl. No. 12/029,615, Non-Final Office Action mailed on Mar. 21, 2014, 29 pages.
U.S. Appl. No. 12/101,420, Notice of Allowance mailed on Mar. 17, 2014, 8 pages.
U.S. Appl. No. 12/029,724, Notice of Allowance mailed on Jun. 24, 2014, 13 pages.
U.S. Appl. No. 12/790,437, Notice of Allowance mailed on Jun. 12, 2014, 5 pages.
U.S. Appl. No. 12/790,445, Notice of Allowance mailed on Jun. 4, 2014, 5 pages.

\* cited by examiner

OPTIMIZATIONS USING A BPEL COMPILER

CROSS REFERENCES

This Application claims priority to Provisional Application No. 61/541,300, filed Sep. 30, 2011, entitled "Optimizations Using a BPEL Compiler." The said provisional application is incorporated in its entirety for all purposes.

BACKGROUND

Business Process Execution Language (BPEL) may be used for defining how business processes interact with web services. In some instances, when a BPEL process is being executed, interaction with an external web service is necessary. Waiting for a response from the external web service or some other entity may take a significant amount of time, such as several minutes, hours, or days. When a response is required, rather than maintaining the BPEL process as active, it may be more efficient to temporarily suspend processing of the BPEL process to free memory and/or processing resources.

To suspend the BPEL process, dehydration may be performed. Dehydration may involve data related to the BPEL process being stored in a data storage structure, such as a database residing on a hard drive, until processing is to resume. Such dehydration may involve all values of variables of the BPEL process being stored and an indication of where in the BPEL code the BPEL process was suspended. This data may be stored as a data "blob" in the data storage structure. Once a response is received from the external web service, the blob may be "rehydrated," such that the values of variables are reloaded from the data storage structure, and the BPEL process can continue being processed.

While temporarily storing variables and other data related to the BPEL process may be more efficient to free memory and/or processing resources, the amount of space necessary to store all of the variables related to the BPEL process may be significant. For example, some variables which may be based on XML may be many kilobytes or possibly megabytes in size. As such, dehydrating all of the variables of a BPEL process may require many megabytes of storage space. If a large number of BPEL processes are run concurrently, the amount of space necessary to store multiple dehydrated BPEL processes concurrently may be significant. Further, dehydrated BPEL processes that are no longer going to be rehydrated may remain stored until manually purged by a user. As this number of dehydrated BPEL processes grow, the amount of storage space consumed also grows.

SUMMARY

In some embodiments, a method for reducing a size of a Business Process Execution Language (BPEL) data blob for storage is presented. The method may include identifying, by a computer system, one or more dehydration points within BPEL code. The method may include performing, by the computer system, a liveness analysis for the one or more dehydration points. The method may include identifying, by the computer system, at each of the one or more dehydration points, one or more live variables from a set of variables. The method may include creating, by the computer system, an optimization data structure that for each dehydration point identifies the one or more live variables.

Embodiments of such a method may include one or more of the following: At runtime, the optimization data structure may be checked when the one or more dehydration points are reached such that the one or more live variables of the set of variables are stored within the BPEL data blob and one or more not-live variables of the set of variables are not stored within the BPEL data blob. The method may include compiling, by the computer system, the BPEL code using a BPEL compiler configured to perform the liveness analysis, thereby creating compiled BPEL code. The method may include executing, by the computer system, a BPEL process using the compiled BPEL code. The method may include dehydrating, by the computer system, the BPEL process at a dehydration point during execution of the BPEL process using the compiled BPEL code. The method may include identifying, by the computer system, using the optimization data structure, the one or more live variables for the dehydration point. The method may include creating, by the computer system, the BPEL data blob that comprises the one or more live variables of the set of variables, but does not comprise not-live variables of the set of variables. The method may include storing, by the computer system, the BPEL data blob. The BPEL data blob may be smaller than if the BPEL data blob contained live and not-live variables. The optimization data structure may be a file that comprises an indication of each variable that is live at each dehydration point of the compiled BPEL code. The optimization data structure may be a file that comprises an indication of each variable that is live at each dehydration point of the compiled BPEL code. At least some variables of the set of variables may be XML variables.

In some embodiments, a computer program residing on a non-transitory processor-readable medium for reducing a size of a business-process data blob for storage is presented. The computer program may include computer-readable instructions configured to cause a computer to identify one or more dehydration points within code. The computer-readable instructions may be further configured to cause the computer to perform a liveness analysis for the one or more dehydration points. The computer-readable instructions may be further configured to cause the computer to identify at each of the one or more dehydration points, one or more live variables from a set of variables. The computer-readable instructions may be further configured to cause the computer to create an optimization data structure that for each dehydration point identifies the one or more live variables.

Embodiments of such a method may include one or more of the following: At runtime, the optimization data structure may be checked when the one or more dehydration points are reached such that the one or more live variables of the set of variables are stored within the business-process data blob and one or more not-live variables of the set of variables are not stored within the business-process data blob. The computer-readable instructions may be further configured to cause the computer to compile the code using a compiler configured to perform the liveness analysis, thereby creating compiled code. The computer-readable instructions may be further configured to cause the computer to execute a process using the compiled code. The computer-readable instructions may be further configured to cause the computer to dehydrate the process at a dehydration point during execution of the process using the compiled code. The computer-readable instructions may be further configured to cause the computer to identify, using the optimization data structure, the one or more live variables for the dehydration point. The computer-readable instructions may be further configured to cause the computer to create the business-process data blob that comprises the one or more live variables of the set of variables, but does not comprise not-live variables of the set of variables. The computer-readable instructions may be further configured to cause the computer to store the business-process data blob.

The business-process data blob may be smaller than if the business-process data blob contained live and not-live variables. The optimization data structure may be a file that comprises an indication of each variable that is live at each dehydration point of the compiled code. The optimization data structure may be a file that comprises an indication of each variable that is live at each dehydration point of the compiled code. At least some variables of the set of variables may be XML variables. The code may be a business process execution language (BPEL) code.

In some embodiments, a method for optimizing a Business Process Execution Language (BPEL) code for execution is presented. The method may include compiling, by a computer system, the BPEL code using a BPEL compiler configured to perform an optimization. The method may include identifying, by the computer system, one or more points within the BPEL code that are eligible for the optimization. The method may include creating, by the computer system, optimized executable BPEL code based on the BPEL code, wherein the optimized executable BPEL code based on the BPEL code has the optimization.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
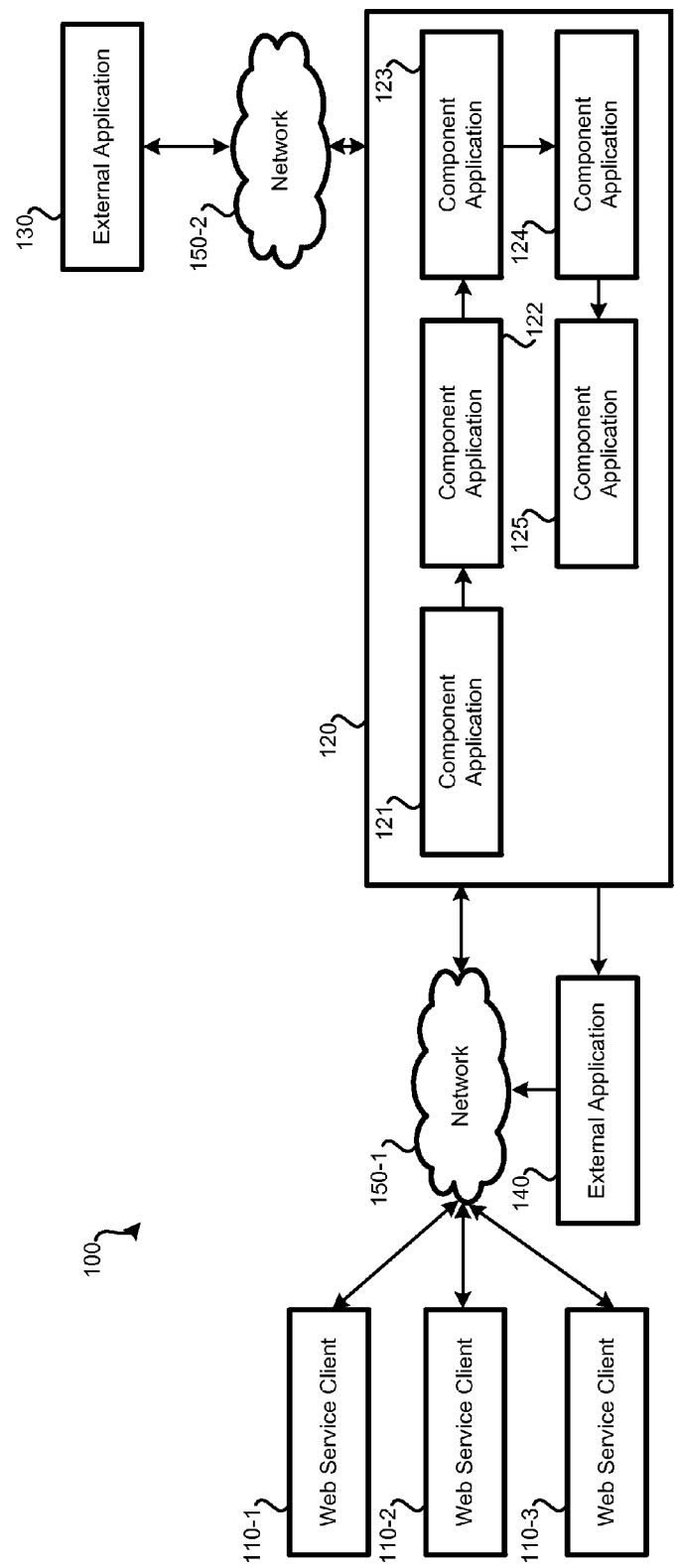
FIG. 1 illustrates an embodiment of a system that includes a BPEL composite application.

Rather than storing the values of all variables when a BPEL process is dehydrated, only variables that have been identified as live may have their value stored. Such live variables may be read following rehydration of the BPEL process. Conversely, following rehydration, a variable that is not read before it is written to (as such, the value of the variable at dehydration does not need to be stored because it is not read before being overwritten), is not live. A significant number of variables may be present in a BPEL process that are stored during dehydration that are superfluous because the variables are not live. Since such variables are not needed to be stored when the process is dehydrated, storage of such variables can waste storage resources. If many BPEL processes are running concurrently, and thus, may be dehydrated concurrently, a significant amount of storage space may be devoted to values of variables that are not needed.

A liveness analysis, also referred to as a live variable analysis, may be performed on the code of the BPEL process to determine which variables are live at various points (that is, variables which may be read before the next write to the variable), and which variables are not live at the points (variables that are not read before they are written to or are not used again). Such a liveness analysis may be performed at the time the code of the BPEL process is compiled. The points evaluated within the code may be points where dehydration is expected to occur. As such, a liveness analysis may be used at the time BPEL code is compiled to determine which variables will be live and which variables will not be live at each dehydration point of the compiled BPEL code. (To be clear, a particular variable may be live at one dehydration point but not live at another dehydration point.)

An optimization data structure (e.g., a file, table, database) may be created based on the liveness analysis. The optimization data structure may specify which variables are live for each dehydration point. To specify which variables are live, indications of the live and/or not live variables may be stored (for example, the optimization data structure may only indicate live variables for a dehydration point, with variables not indicated being considered not live). When a BPEL (runtime) process reaches a dehydration point, it may be configured (through how it was compiled) such that it uses the optimization data structure to determine which variables should be retained during dehydration and which variables should be discarded. In some embodiments, the optimization data structure may indicate each variable that should be stored for each dehydration point. For example, if a first dehydration point is reached when creating a data blob (as used within this document, a data blob may refer to structured or unstructured data stored within a database or other storage structure) for storage, the BPEL process may examine the optimization data structure to determine which variables are to be retained at the first dehydration point. Only variables identified as live at the first dehydration point may be retained for storage within the data blob. The data blob may then be stored in a data structure until the BPEL process is to continue being processed.

The size of the data blob having only live variables that is temporarily stored is smaller than the size of the data blob if live and not live variables had been stored. In some instances, the size of the data blob with only live variables may be significantly smaller. For example, in a test embodiment, a data blob storing all variables was 237 kb, while when only live variables were stored within the data blob, the data blob was 42 kb, roughly a five-fold decrease in size. If many BPEL processes are dehydrated concurrently, the total storage space needed may be decreased significantly (e.g., by a factor of 5). This is especially important to consider when large numbers of processes may be dehydrated concurrently, such as thousands of concurrent BPEL processes.

While this document focuses on the BPEL programming language, it should be understood that similar systems and methods may be applied to other business-process programming languages, such as business-process programming languages that permit temporary dehydration of a process being executed. More generally, such principles may be applied to other programming arrangements that permits dehydration and rehydration of a process being executed.

FIG. 1 illustrates an embodiment of a system 100 that includes a BPEL composite application 120 that has been compiled into JAVA code and is executed as a BPEL runtime process. System 100 includes: web service clients 110, BPEL composite application 120, external applications 130 and 140, and networks 150. Web service clients 110 may be entities (e.g., remote computer systems) that request a web service from BPEL composite application 120. Web service clients 110 may be operated by users. Web service clients 110 may communicate with BPEL composite application 120 via network 150-1. While system 100 is illustrated as having three web service clients (110-1, 110-2, and 110-3), more or fewer web service clients may be present. For example, BPEL composite application 120 may be executed for one web service client, or tens, hundreds, or thousands of web service clients.

Network 150-1 may represent one or more public and/or private networks. Network 150-1 may represent the Internet. As such, network 150-1 may allow web service clients 110 to communicate with BPEL composite application 120. In some embodiments, one or more of web service clients 110 may communicate with BPEL composite application 120 without using network 150-1.

BPEL composite application 120 may represent a process-oriented composite application created using BPEL. Instances of BPEL composite application 120 may be executed as one or more runtime processes (not illustrated). Processes based on BPEL composite application 120 may be executed by one or more computer systems. For example, each web service client of web service clients 110 may interact with a process being executed that is based on BPEL composite application 120. As such, different processes may represent different instantiations of BPEL composite application 120. In some embodiments, BPEL may be used as part of ORACLE's Service Oriented Architecture (SOA) for designing, deploying, and managing composite applications. A process-oriented composite application may include various component applications (in system 100, component applications 121, 122, 123, 124, and 125 are present) to provide an output or result to some external application or to a web service client. Each component application may perform one or more particular functions, with the output of one component application serving as an input to one or more other component applications that are linked. Such an arrangement may allow for a designer to program in a declarative nature, that is, allowing the designer to specify what outputs the composite application should accomplish, but not how it should accomplish generating those outputs on the code level. For example, for a designer to create a BPEL composite application, the designer may use a graphical user interface to interconnect a series of component applications in a desired order. The resulting composite application may then use this combination and order of component applications to provide an output.

A process-oriented composite application may process threads for many different web service clients simultaneously or near-simultaneously (this may also be referred to as multiple processes of the process-oriented composite application being executed simultaneously or near-simultaneously). As such, BPEL composite application 120 may have multiple associated BPEL processes (also referred to as BPEL runtime processes) being executed at the same time. For example, component application 122 may be being executed as part of a first BPEL process in relation to web service client 110-1, while component application 124 is being executed as part of a second BPEL process in relation to web service client 110-2. Further, a single component application may be executed on behalf of multiple web service clients. For example, component application 123 may be executed as part of the first and second processes in relation to web service client 110-1 and web service client 110-3 at the same time. In practice, if a composite application is serving as a web service for a large number of web service clients, each component application may be being executed as part of BPEL processes linked with tens or hundreds of web service clients at the same time.

The processing of a request received from a web service client of web service clients 110 by a BPEL process performing BPEL composite application 120 may result in the component applications being performed in a set order. When a request is received by a BPEL process performing BPEL composite application 120 from a web service of web service clients 110, an instance of component application 121 may initially process the request. After the instance of component application 121 has performed one or more functions, the instance of component application 121 may transmit data to an instance of component application 122. The instance of component application 122 may perform predefined functions different from the functions performed by the instance of component application 121. Following processing the data received from the instance of component application 121, the instance of component application 122 may forward data to the instance of component application 123. The instance of component application 123 may interact with an external application, such as external application 130. External application 130 may be operated on behalf of the same entity or a different entity from the entity that operates BPEL composite application 120. For example, external application 130 may be operated by a financial institution, another company, a different department, etc. For the instance of component application 123 to proceed, it may submit a request to external application 130 via network 150-2. The instance of component application 123 may wait until a response is received from external application 130 before any further processing of the thread. The timing of the response from external application 130 may be based on the nature of the request. For example, a database lookup by external application 130 may take a short period of time, such as less than a second. However, an approval for a loan that is to be processed by external application 130, which may require an employee of the financial institution to manually review information, may take multiple days. As such, this may be a point in a BPEL process where the process is dehydrated until a response is received, thus freeing memory and/or processing resources while waiting for a response.

Once a response is received, the instance of component application 123 may continue to process the data related to the corresponding web service client. Once the instance of component application 123 has completed its function, data may be passed to an instance of component application 124. As an example, the instance of component application 124 may require additional information to be provided by the corresponding web service client. A request may be sent to the appropriate web service client. Again, processing of a composite application in relation to the web service client may halt until a response is received, possibly for a short period of time, such as 300 milliseconds, or possibly multiple days or even weeks. This may be another point where the BPEL process is dehydrated until a response is received in order to free processing and/or memory resources. Once the instance of component application 124 has completed processing data related to the request received from the web service client, an instance of component application 125 may be processed.

The order of processing instances of component application 121, followed, in order, by component application 122, component application 123, component application 124, and component application 125 may be set, as coded in BPEL by the designer of BPEL composite application 120. As such, every initial request received from a web service client may be handled in the same manner: processed, in order, by component applications 121 through 125.

Following the instance of component application 125 processing the data related to the web service client passed by the instance of component application 124, a final output may be routed to an external application, such as external application 140, or may be routed back to the web service client that initiated the processing of the instance of BPEL composite application 120 being executed as a BPEL process. If routed to external application 140, external application 140 may perform some level of processing on the data received from component application 125. External application 140 may then route a result to the appropriate web service of web service clients 110 via network 150-1. Alternatively, some other application or web service client may receive the output of BPEL composite application 120.

The process of performing the web service process for a web service client may take a short period of time, such as less than a second, or may take many hours or days to complete. If a large number of web service clients are using the web service provided by instances of BPEL composite application 120 and instances of the composite application within the BPEL processes take a long period of time to execute from start to finish, the BPEL processes may result in a large amount of data being stored and/or processed for web service clients 110. For periods of inactivity during the processing of instances of BPEL composite application 120 for particular web service clients, the associated processing threads (referred to as processes or BPEL processes) may represent a waste of processing and/or memory resources. As such, it may not be efficient to maintain data linked with a BPEL process in memory local to BPEL composite application 120, especially if BPEL composite application 120 is handling requests from many web clients at once and does not have excess memory to spare. Similarly, it may not be efficient to maintain BPEL processes in memory if nothing related to the web service client currently requires active processing. As such, dehydration of such BPEL processes may be used to free processing and/or memory resources.

Figure 3:
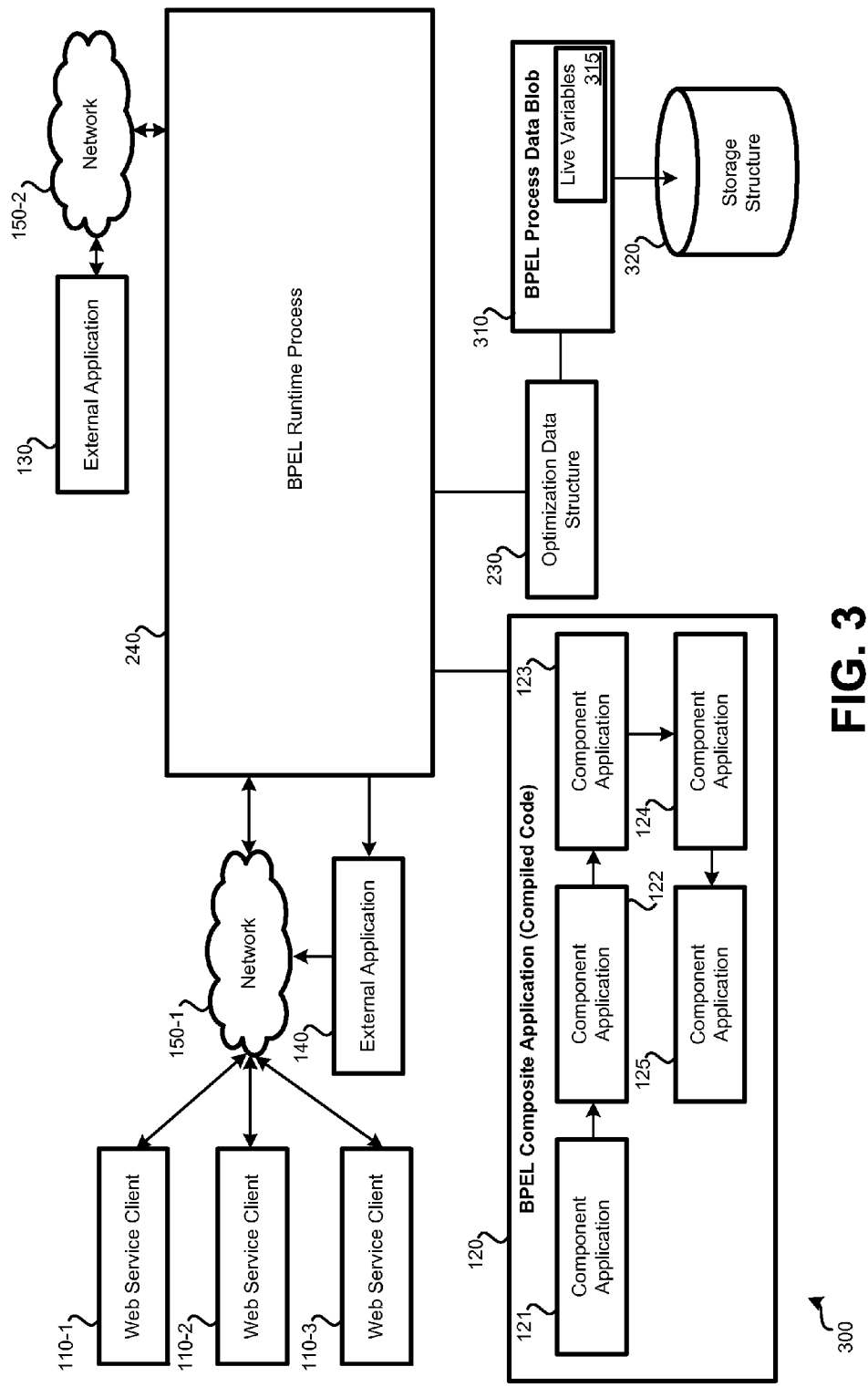
FIG. 3 illustrates an embodiment of a system configured to dehydrate a BPEL process using an optimization data structure.
Figure 4:
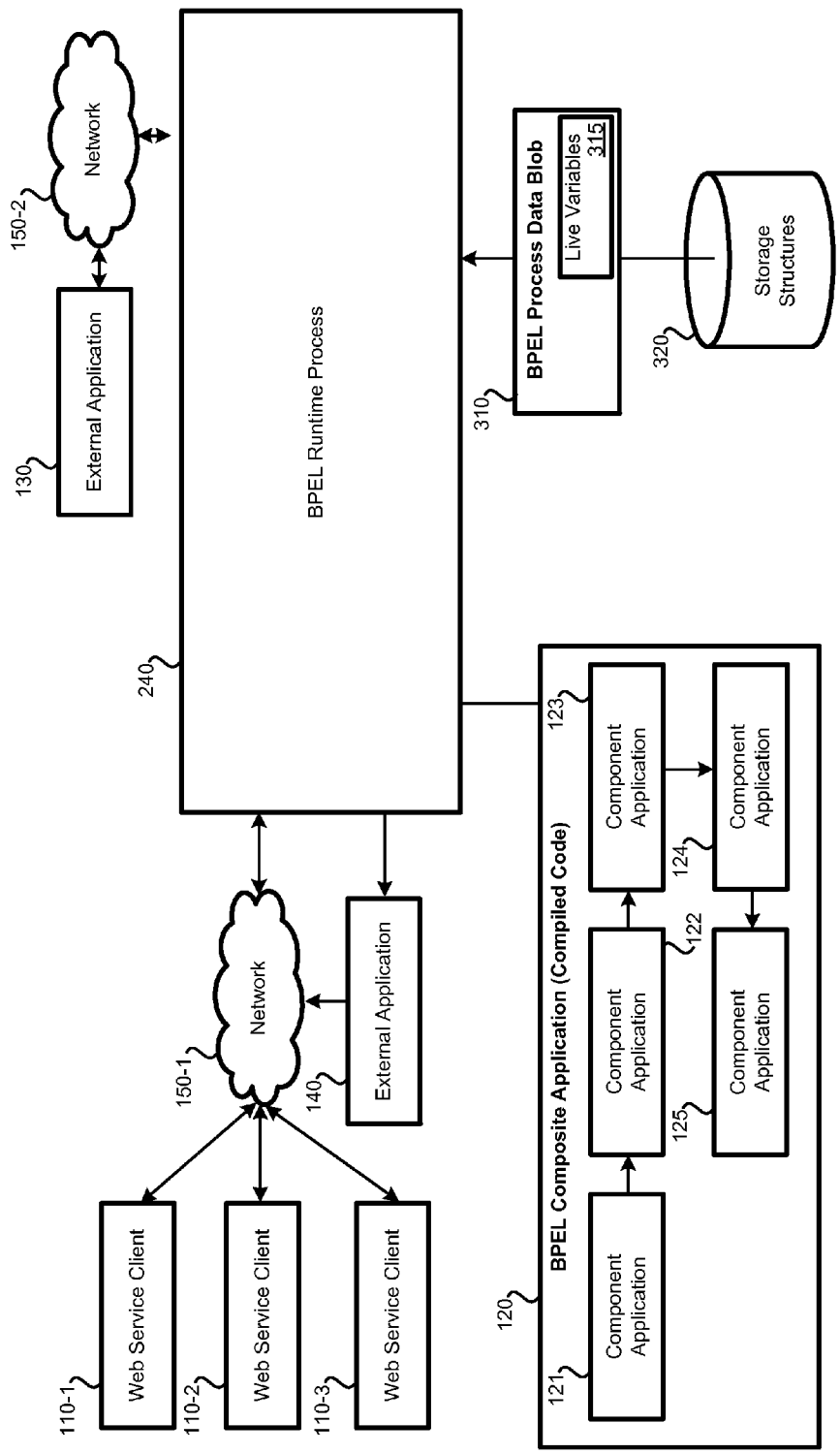
FIG. 4 illustrates an embodiment of a system configured to rehydrate a BPEL process.

While BPEL composite application 120 contains five component applications, and only one external application (external application 130) is illustrated as interacting with a component application, it should be understood that BPEL composite application 120 is an example only and is not intended to be limiting in how the component applications of a composite application may interact with each other or with external applications. Embodiments of other BPEL composite applications may contain fewer or more component applications, may interact with more or fewer external applications, and/or may have a different process flow. It should be understood that FIG. 1 is intended to illustrate how BPEL composite application 120 may be executed for multiple web service clients and may involve multiple processes being executed. In FIGS. 3 and 4, a single BPEL runtime process is illustrated as being executed for a client. Such a single BPEL runtime process can represent an instance of BPEL composite application 120 (or some other composite application).

Figure 2:
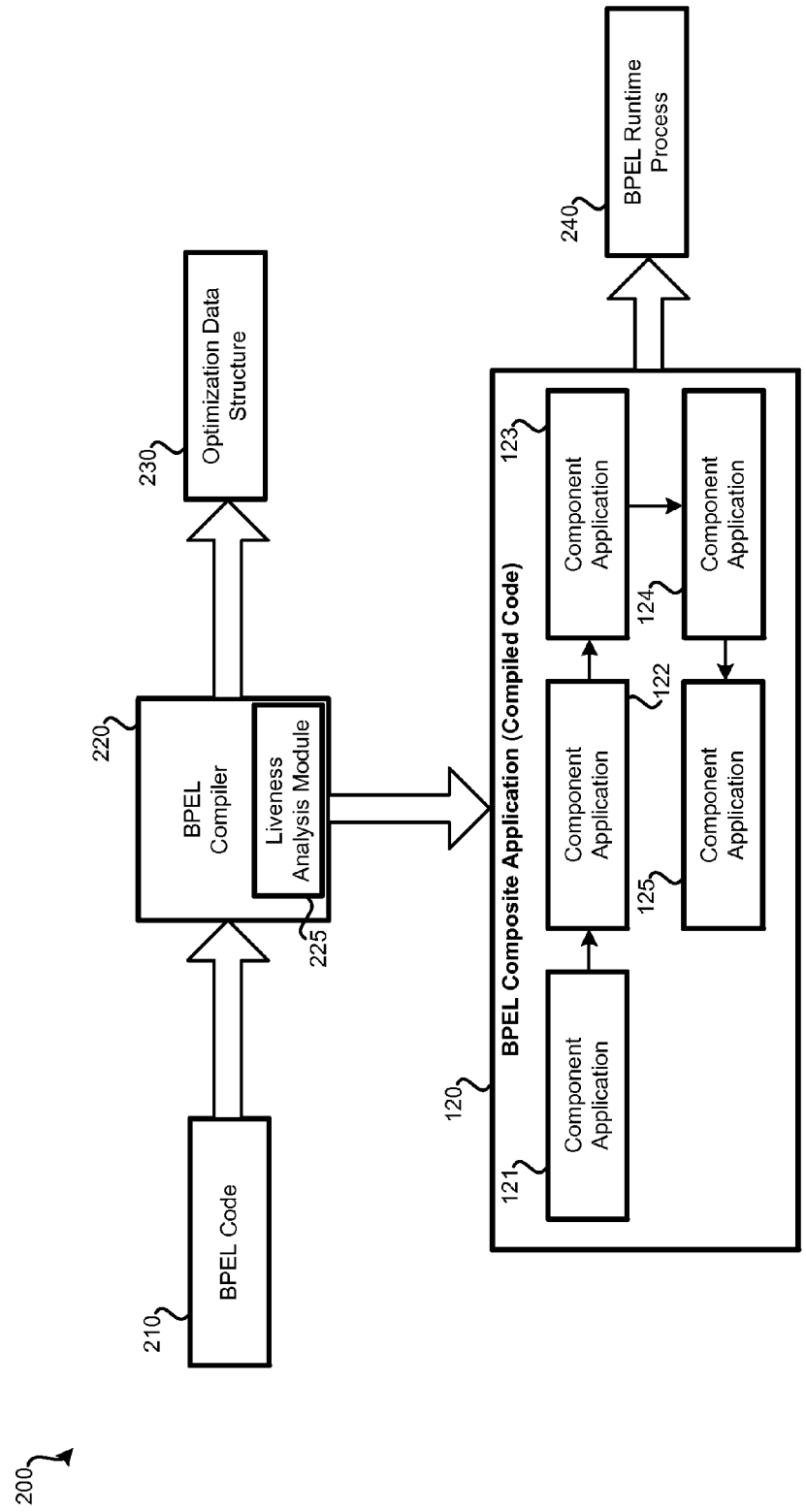
FIG. 2 illustrates an embodiment of a system for compiling a BPEL composite application and creating an optimization data structure.

FIG. 2 illustrates an embodiment of a system 200 for compiling a BPEL composite application and creating an optimization data structure. In system 200, BPEL code 210 is used by BPEL compiler 220 to create executable BPEL composite application 120 and to create optimization data structure 230. As such, BPEL composite application 120 of system 100 may be created using BPEL compiler 220 of system 200. Each component of system 200 may represent a different module. Each module may be executed and/or stored using one or more computer systems.

BPEL code 210 may be written by a software designer (or, more generally, any user). BPEL code 210 may contain various references to external applications. At runtime, interaction with these external applications or some other external entity may take extended amounts of time. For example, some external applications may require lengthy periods of time to respond, such as several minutes, hours, days, or weeks. BPEL code 210 may be compiled by BPEL compiler 220.

BPEL compiler 220 may compile BPEL code 210 to create compiled code (which may be JAVA) that may be executed as one or more BPEL processes, such as BPEL runtime process 240. During execution, BPEL runtime process 240 may access compiled BPEL code 210. BPEL compiler 220 may be configured to identify one or more points within BPEL code 210 where dehydration of a BPEL process will occur during execution. For example, such points may occur when a response from an external source, such as an external application, is required. At such a point, the BPEL runtime process being executed may need to wait for a response from the external application. Such points may be identified as dehydration points because, from an efficiency standpoint, it may be efficient to stop executing the BPEL process and remove the BPEL process from memory and/or from having an associated processing string of the BPEL runtime process be executed by a processor. Data, such as variable values, of the BPEL runtime process may be stored in a storage structure until execution of the BPEL runtime process is to continue. At some or all of these dehydration points, BPEL compiler 220 may be configured to perform a liveness analysis.

Liveness analysis module 225 of BPEL compiler 220 may perform the liveness analysis. The following description assumes that one skilled in the art is familiar with the general concept of a liveness analysis. A liveness analysis, also referred to as live variable analysis, may be performed, possibly by a compiler during the process of compilation, to calculate at one or more points whether one or more variables may be read before being written to. If a variable may be read before the next write to the variable, the variable is considered live; if not, the variable is considered not live. Liveness analysis module 225 may analyze the state of some or all variables used within BPEL code 210 being compiled. At some or all of the points within BPEL code 210 identified as dehydration points, a determination may be made whether a variable is live or not live. A variable may be determined to be live if, following rehydration, a read of the variable is performed before a write to the variable is performed. A variable may be determined to not be live if: following rehydration, a write to the variable is performed before a read; and/or the variable is not used for the remainder of BPEL code 210.

Liveness analysis module 225 may be used to create optimization data structure 230. Optimization data structure 230 may take the form of one or more files. As an example, a single file may be created for a composite application. This file may have a file extension of, for example, .opt. This file may also have the same name as the composite application. Within optimization data structure 230, liveness analysis module 225 may indicate variables that are live for each dehydration point within BPEL code 210. As such, for each dehydration point, a listing of one or more variables that are live may be provided within optimization data structure 230. If no variables are live at a particular dehydration point, no variables may be entered for that dehydration point within optimization data structure 230.

As an example of a possible content of optimization data structure 230, the following line may be present:

compositeName.opt:201:<scopeName:xx>

This exemplary line of optimization data structure 230 may indicate that variable "xx" is live at line 201 of BPEL code 210. Additional information, such as the name of the composite and/or scope, may be present to distinguish the variable from a similarly named variable that may be present in another scope and/or composite. As those with skill in the art will recognize, scopes and other forms of BPEL notation are defined in the BPEL standard.

If a variable is not listed in optimization data structure 230 for a dehydration point, it may be determined that the variable is not live at that dehydration point (the same variable may be live or not live at other dehydration points). While in system 200, optimization data structure 230 lists live variables; in other embodiments, optimization data structure 230 may list variables that are not live. In other embodiments, optimization data structure 230 may list live and not live variables and indicate them as such. In some embodiments, multiple optimization data structures 230 may be created by liveness analysis module 225 of BPEL compiler 220.

BPEL compiler 220 may create BPEL composite application 120 based on BPEL code 210. BPEL composite application 120 may be compiled code (e.g., JAVA); the existence of the composite applications within the compiled code of BPEL composite application 120 illustrates that the code is based on the component applications used to create the compiled code. BPEL compiler 220 may compile BPEL code 210 such that BPEL runtime process 240, which is an executing instance of BPEL composite application 120, accesses optimization data structure 230 when the process is to be dehydrated. BPEL composite application 120 may be coded by BPEL compiler 220 such that if a variable is listed as live for a dehydration point within optimization data structure 230, the variable is retained in the data blob created during dehydration at that dehydration point; if a variable is not listed as live for the dehydration point within optimization data structure 230, the variable is not to be retained in the data blob created during dehydration at that dehydration point. As such, only variables that are live may be retained within the data blob. While in system 200, BPEL composite application 120 is coded such that BPEL runtime process 240 refers to optimization data structure 230 for variables to be retained when dehydrated; in other embodiments, the reverse may be possible: BPEL composite application 120 may be coded such that BPEL runtime process 240 refers to optimization data structure 230 to determine which variables are not live and may be ignored when a data blob is created at a dehydration point. The variables that are indicated as live (and thus stored) and not live (and thus not stored) may vary from dehydration point to dehydration point within the same composite application.

FIG. 3 illustrates an embodiment of a system 300 configured to dehydrate a BPEL runtime process using an optimization data structure. System 300 may comprise one or more computer systems to execute and/or store various illustrated modules. For example, BPEL runtime process 240 may be executed by one or more computer systems. Each of web service clients 110 may be a separate computer system. System 300 may represent system 100 operating in conjunction with optimization data structure 230. When the execution of the (JAVA) code of BPEL composite application 120 (that is, the BPEL runtime process 240 that is an instance of BPEL composite application 120) reaches a dehydration point (e.g., a point where a response from an external application is being waited for), BPEL runtime process 240 may be dehydrated. Such a dehydration may involve data related to BPEL runtime process 240 being stored in a storage structure, such as a database or stack.

When BPEL runtime process 240 is dehydrated, variables of BPEL runtime process 240 may be compared to indications of variables in optimization data structure 230 for the dehydration point reached by BPEL runtime process 240. Optimization data structure 230 may indicate a number of variables (e.g., 0, 1, more than one) that are live at the dehydration point reached by BPEL runtime process 240. The values of the variables identified as live as indicated by optimization data structure 230 may be maintained when BPEL runtime process 240 is dehydrated. Variables that are not live at the dehydration point reached by BPEL runtime process 240 as indicated by optimization data structure 230 may not be retained when BPEL runtime process 240 is dehydrated.

BPEL process data blob 310 may be created based on BPEL runtime process 240 and optimization data structure 230. Within BPEL process data blob 310, some number of live variables 315 may be present. BPEL process data blob 310 may contain variables that are live, but may not contain variables that are not live. As such, BPEL process data blob 310 may be smaller in size than a BPEL process data blob having both live and not live variables. The BPEL process data blob 310 may be stored using storage structure 320. Storage structure 320 may be a storage arrangement such as a table, stack, or database stored on a non-transitory computer-readable medium, such as a hard drive. BPEL process data blob 310 may remain stored in storage structure 320 until the response has been received from the external application that triggered the dehydration.

FIG. 3 illustrates a single BPEL runtime process being dehydrated. BPEL runtime process 240 may be being executed for a particular web service client, such as web service client 110-3. It should be understood that numerous BPEL runtime processes may be executed concurrently as instances of BPEL composite application 120 for multiple web service clients. As such, at any given time, one or more BPEL runtime processes may be being executed and one or more BPEL runtime processes may be dehydrated in storage structure 320.

FIG. 4 illustrates an embodiment of a system 400 rehydrating the BPEL runtime process 240 of system 300. System 400 may represent system 300 when BPEL process data blob 310 is to be rehydrated. In system 400, a trigger may have been received in relation to BPEL runtime process 240 that initiates rehydration of BPEL process data blob 310 such that BPEL runtime process 240 may continue to be executed. For example, a response from an external application, such as external application 130, related to BPEL runtime process 240 may have been received.

To rehydrate BPEL runtime process 240, BPEL process data blob 310 may be recalled from storage structure 320. BPEL process data blob 310, which contains live variables 315 (but does not contain variables that were not indicated as live by optimization data structure 230 of FIG. 3), may be used to rehydrate the BPEL process for execution by BPEL runtime process 240. Live variables 315 may be used to rehydrate BPEL runtime process 240. During rehydration, it may not be necessary to access an optimization data structure because the values of variables present within BPEL process data blob 310 are already determined to be live during dehydration. Variables that were not live as indicated by optimization data structure 230 may not be instantiated with a particular value when BPEL runtime process 240 is rehydrated. A default value such as 0 (or an appropriate value based on the variable type) may be used for non-live variables. In some embodiments, it may be possible to skip assigning a value to the not live variables upon rehydration. Following rehydration of BPEL process data blob 310, execution of BPEL runtime process 240 may continue. At some future point, BPEL runtime process 240 may again be dehydrated. At such a second dehydration point, one or more of the same or different variables may be identified as live according to optimization data structure 230. BPEL runtime process 240 may be dehydrated and rehydrated various numbers of times as required for execution of the instance of BPEL composite application 120 as BPEL runtime process 240. Which variables are retained as live, if any, may be defined by optimization data structure 230 for each dehydration point.

While system 300 and system 400, of FIGS. 3 and 4, respectively, illustrate a single BPEL runtime process being dehydrated and rehydrated, it should be understood that many BPEL processes may be at various stages of execution, dehydration, and rehydration. For example, it may be possible that tens, hundreds, or thousands of BPEL runtime processes may be at various stages of execution, dehydration, and/or rehydration of BPEL composite application 120.

Figure 5:
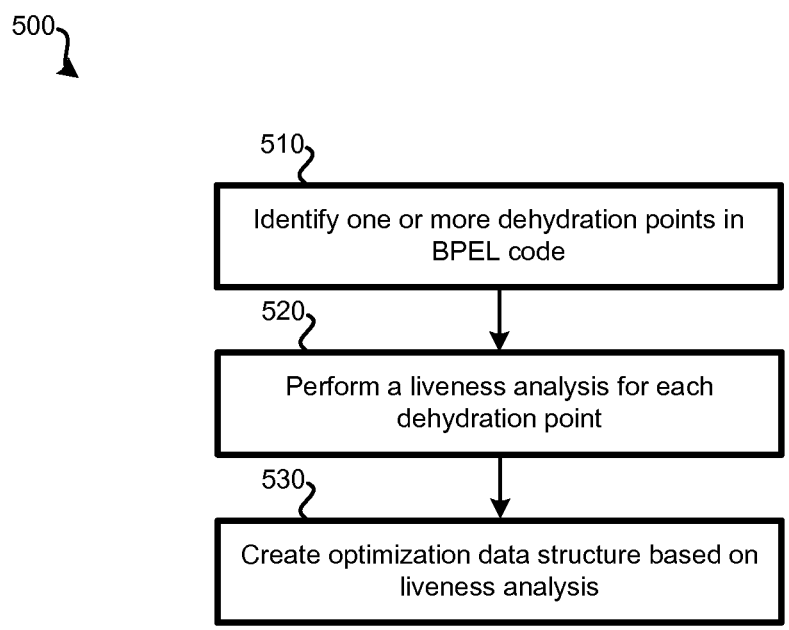
FIG. 5 illustrates an embodiment of a method for creating an optimization data structure to be used for reducing the size of a BPEL data blob for storage.

Various methods may be performed in conjunction with the previously detailed systems. FIG. 5 illustrates an embodiment of method 500 for creating an optimization data structure to be used for reducing a size of a data blob to be used for storage. Method 500 may be performed by system 200 of FIG. 2 or some other system configured to compile a BPEL composite application and creating an optimization data structure. As such, method 500 may be performed using one or more computer systems.

During the process of being compiled by a BPEL compiler (or possibly following compilation), one or more dehydration points within the BPEL code may be identified at step 510. A dehydration point may be identified based on whether a response is needed from an external application (or some other external source) before continuing to execute the compiled BPEL code for a BPEL runtime process. More generally, a dehydration point may be any point during execution of a BPEL runtime process that it may be efficient to remove the BPEL runtime process from being actively processed to a storage structure (e.g., hard drive) for a period of time. The points within BPEL code that are considered dehydration points may be predefined. For example, when an event is being waited for, such as a wait activity, an on-alarm branch of a pick activity, a receive activity, and an on-message branch of a pick activity, it may trigger dehydration. A nonidempotent activity may trigger dehydration if a retry of one or more steps is desired.

At step 520, a liveness analysis for each dehydration point identified at step 510 may be performed. The liveness analysis may be conducted by the compiler. In some embodiments, the liveness analysis may be performed by a separate entity from the compiler during compilation. Such a liveness analysis may determine at the one or more dehydration points whether some or all variables used by the BPEL runtime process during execution of the compiled BPEL code are live or not live. A live variable may be identified as a variable that, following rehydration, is read before it is written to.

At step 530, an optimization data structure may be created based on the liveness analysis of step 520. For some or all of the dehydration points identified at step 620, the optimization data structure may be configured to indicate which variables are live (and/or which variables are not live). In some embodiments, rather than indicating which variables are live, the optimization data structure may indicate which variables are not live. The optimization data structure created at step 530 may take the form of one or more computer-readable files.

While method 500 is directed to the use of BPEL, it should be understood that a similar method may be applied to other business-process directed programming languages that are configured to have processes dehydrated.

Figure 6:
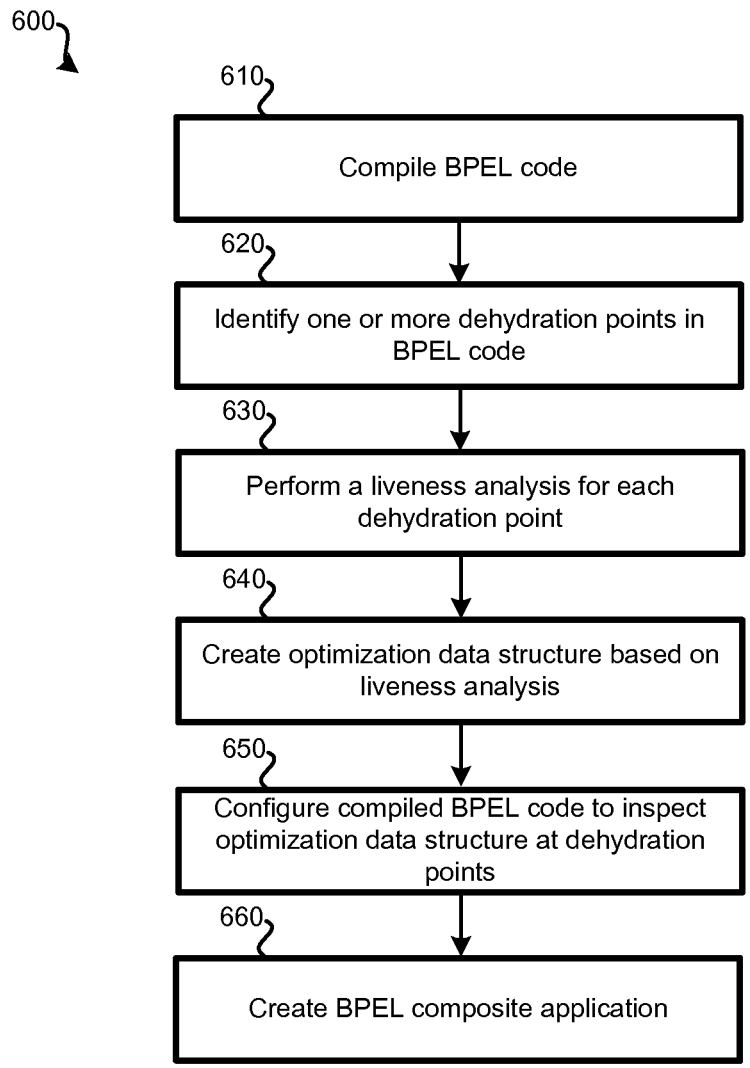
FIG. 6 illustrates another embodiment of a method for creating an optimization data structure to be used for reducing the size of a BPEL data blob for storage.

FIG. 6 illustrates an embodiment of method 600 for creating an optimization data structure to be used for reducing the size of a data blob for storage. Method 600 may be a more detailed embodiment of method 500. The method 600 may be performed by system 200 of FIG. 2. More specifically, BPEL compiler 220, as executed by one or more computer systems, may perform each step of method 600. In some embodiments, some other form of BPEL compiler may perform the steps of method 600.

At step 610, the BPEL code may start to be compiled. For example, referring to FIG. 2, BPEL code 210 may have been written by a software designer, and may be compiled by BPEL compiler 220.

During the process of being compiled by a BPEL compiler, one or more dehydration points within the BPEL code may be identified at step 620. A dehydration point may be identified based on whether a response is needed from an external application (or some other external source) before continuing to execute the compiled BPEL code for a BPEL runtime process. The points within BPEL code that are considered dehydration points may be predefined. For example, when an event is being waited for, such as a wait activity, an on-alarm branch of a pick activity, a receive activity, and an on-message branch of a pick activity, it may trigger dehydration. A non-idempotent activity may trigger dehydration if a retry of one or more steps is desired.

At step 630, a liveness analysis for each dehydration point identified at step 620 may be performed. The liveness analysis may be conducted by the compiler. In some embodiments, the liveness analysis may be performed by a separate entity from the compiler during or after compilation. Such a liveness analysis may determine at one or more dehydration points whether some or all variables used by the BPEL runtime process during execution of the compiled BPEL code are live or not live. A live variable may be identified as a variable that, following rehydration, is read before it is written to.

At step 640, an optimization data structure may be created based on the liveness analysis of step 630. For some or all of the dehydration points identified at step 620, the optimization data structure may be configured to indicate which variables are live (and/or which variables are not live). In some embodiments, rather than indicating which variables are live, the optimization data structure may indicate which variables are not live. The optimization data structure of step 640 may take the form of one or more computer-readable files.

At step 650, the BPEL code being compiled may be configured to, when executed as a BPEL runtime process, access the optimization data structure when a dehydration point has been reached. The compiled BPEL code may be further configured such that during dehydration only variables that are indicated by the optimization data structure as live at the dehydration point have their values retained. As such, variables identified in the optimization data structure as not live at the dehydration point (e.g., by not being included in the optimization file structure) will not have a value retained when a BPEL runtime process is dehydrated at the dehydration point.

At step 660, the compiled BPEL composite application may be created. One or more instances of this compiled BPEL composite application may be executed using one or more BPEL runtime processes. During execution, these BPEL runtime processes may refer back to the compiled code of the BPEL composite application.

While method 600 is directed to the use of BPEL, it should be understood that a similar method may be applied to other business-process directed programming languages that are configured to have processes dehydrated, or, more generally, other programming languages that are configured to have processes dehydrated.

Figure 7:
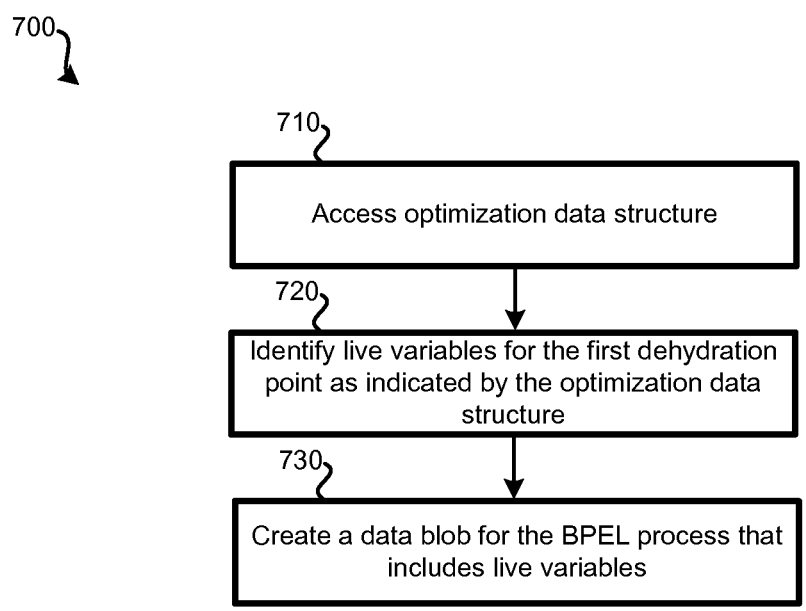
FIG. 7 illustrates an embodiment of a method for dehydration of a BPEL runtime process using an optimization data structure.

FIG. 7 illustrates an embodiment of method 700 for dehydration of a BPEL runtime process using an optimization data structure. Method 700 may be performed using system 300 of FIG. 3 or some other system configured to dehydrate and rehydrate a BPEL process using an optimization data structure. More specifically, BPEL composite application 120, executed by a computer system, may perform each step. In some embodiments, some other form of BPEL composite application may perform the steps of method 700. BPEL composite application 120 may have been compiled in accordance with method 500 of FIG. 5 or method 600 of FIG. 6. In some embodiments, some other method of compiling the composite application that can perform the steps of method 700 may have been used.

When a dehydration point is reached, the optimization data structure may be accessed at step 710. The optimization data structure may be accessed in order to determine which variables should be maintained during dehydration and which variables may be discarded. Such an optimization data structure may have been created in accordance with method 500 of FIG. 5 or method 600 of FIG. 6.

At step 720, live variables at the dehydration point may be identified using the optimization data structure. The optimization data structure may indicate zero, one, or more variables that are live for each dehydration point within the BPEL composite application. As such, following step 720, zero, one, or more than one live variable may be identified by the BPEL composite application based on the optimization data structure.

At step 730, a data blob for the BPEL runtime process may be created. The data blob may contain stored data related to values of variables that were indicated as live, but not variables of variables not indicated as live. The data blob may be in some form of structured data or an unstructured binary set of data. As such, the data blob created at step 730 may contain live variables, but may not contain variables that are not live at the dehydration point as identified by the optimization data structure.

Figure 8:
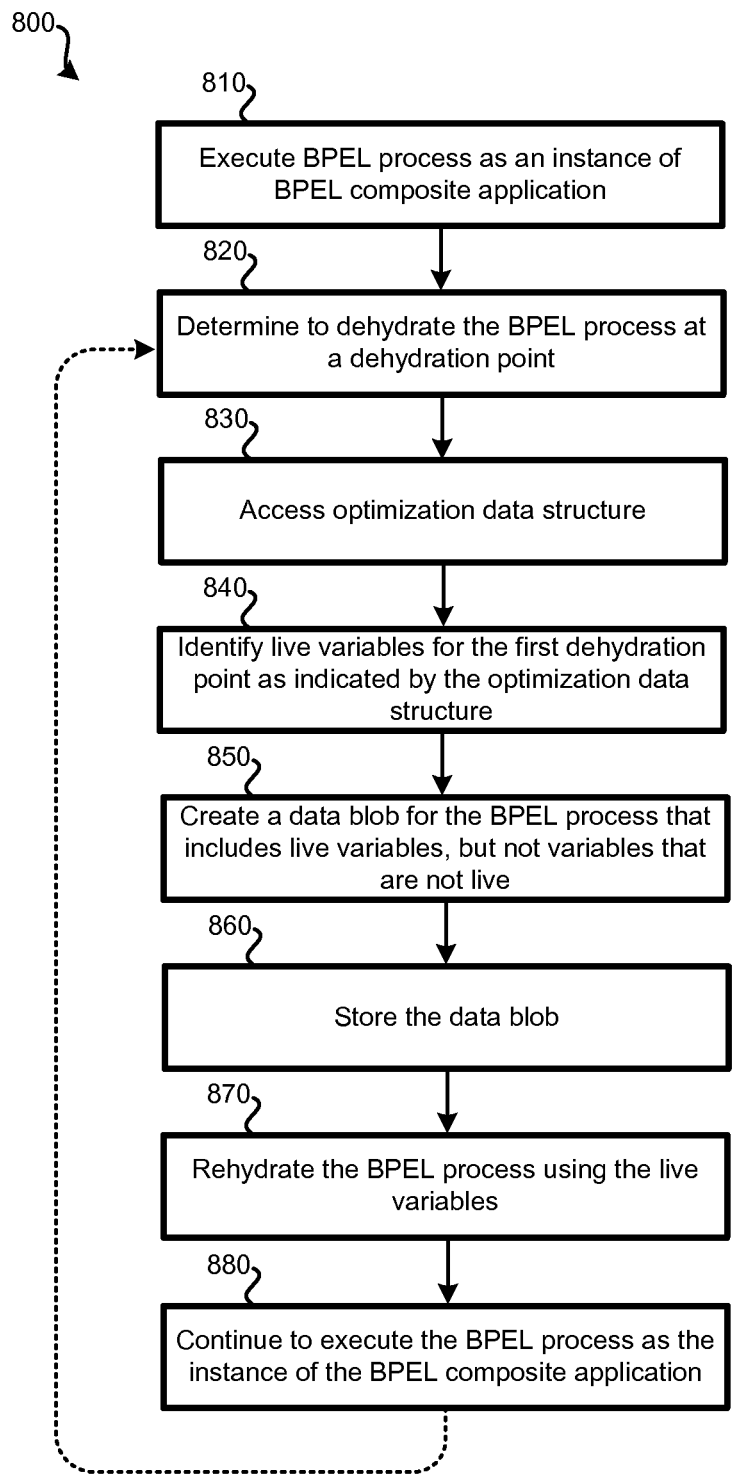
FIG. 8 illustrates another embodiment of a method for dehydration of a BPEL runtime process using an optimization data structure.

FIG. 8 illustrates an embodiment of method 800 for dehydrating a BPEL process using an optimization data structure. Method 800 may represent a more detailed embodiment of method 700. Method 800 may be performed using system 300 of FIG. 3 or some other system configured to dehydrate and rehydrate a BPEL process using an optimization data structure. More specifically, an instance of BPEL composite application 120, executed by a computer system, may perform each step. In some embodiments, some other form of BPEL composite application may perform the steps of method 800. BPEL composite application 120 may have been compiled in accordance with method 500 of FIG. 5 or method 600 of FIG. 6. In some embodiments, some other method of compiling the composite application that can perform the steps of method 800 may have been used.

At step 810, a BPEL composite application may be executed. The BPEL composite application executed at step 810 may be the BPEL composite application compiled using method 500 of FIG. 5 or method 600 of FIG. 6. Execution of the BPEL composite application may result in a BPEL runtime process based on the BPEL composite application being executed until a dehydration point is reached.

At step 820, a determination may be made to dehydrate a BPEL runtime process because a dehydration point has been reached. The dehydration point may be based on a point in the BPEL composite application where a response is required from an external application (or some other external source), and such a response may take a significant amount of time to receive.

Following determining the dehydration should occur at a dehydration point, the optimization data structure may be accessed at step 830. The optimization data structure may be accessed in order to determine which variables should be maintained during dehydration and which variables may be discarded. Such an optimization data structure may have been created in accordance with method 500 of FIG. 5.

At step 840, live variables at the dehydration point determined at step 820 may be identified using the optimization data structure. The optimization data structure may indicate zero, one, or more variables that are live for individual dehydration points within the BPEL composite application. As such, following step 840, zero, one, or more than one live variable may be identified by the BPEL composite application based on the optimization data structure.

At step 850, a data blob for the BPEL process may be created. The data blob may contain stored data related to values of variables that were indicated as live in the optimization data structure, but not values of variables not indicated as live. The data blob may be in some form of structured data or an unstructured binary set of data. As such, the data blob created at step 850 may contain live variables, but may not contain variables that are not live at the dehydration point as identified by the optimization data structure.

At step 860, the data blob created based on the BPEL process and the optimization data structure may be stored using a storage structure. Such a storage structure may be a non-transitory computer readable medium. Referring to FIG. 3, BPEL composite application 120 (being executed as BPEL runtime process 240) uses optimization data structure 230 to create BPEL process data blob 310 when a dehydration point of BPEL composite application 120 is reached. The BPEL process data blob 310 is stored in storage structure 320 until rehydration. The BPEL process data blob stored at step 860 (which may have only variables that are live) may be smaller than a BPEL process data blob that contains both live and not live variables. The live variables stored may include one or more live XML variables.

At step 870, the BPEL runtime process may be rehydrated. The BPEL runtime process may be rehydrated based on the BPEL runtime process data blob stored at step 860. Rehydration of the BPEL runtime process may be triggered by the response being received from an external application related to the BPEL runtime process. Rehydration of the BPEL runtime process using the data blob associated with the dehydrated BPEL runtime process may include instantiating the live variables as stored in the data blob. Variables that were not stored as live as part of the data blob may not be instantiated during rehydration.

Following rehydration, execution of the BPEL runtime process instance of the BPEL composite application may continue at step 880 from the point where the BPEL runtime process was dehydrated. At some future point, as represented by the dotted arrow, dehydration may occur again. At this second dehydration point, the same or different variables may be identified as live or not live by the BPEL composite application as defined in the optimization file structure. This process may repeat for as many dehydration/hydration cycles that occur for a BPEL process of a BPEL composite application.

While method 800 is directed to the use of BPEL, it should be understood that a similar method may be applied to other business-process directed programming languages that are configured to have processes dehydrated, or, more generally, other programming languages that are configured to have processes dehydrated.

While the above systems and methods focus on optimizing BPEL code by reducing BPEL data blob size by eliminating variables that are not live, it may be possible to apply similar principles as detailed herein to perform other compiler optimization in BPEL. For example, copy propagation may be optimized using similar techniques. Other possible optimizations include: automatic parallelization, constant folding, algebraic simplifications, value numbering, copy propagation, constant propagation, sparse conditional constant propagation, common subexpression elimination (CSE), partial redundancy elimination, dead code elimination, induction variable elimination, strength reduction, loop optimizations (e.g., loop invariant code motion and loop unrolling), software pipelining, inlining, code generator (optimizations) (e.g., register allocation: local and global, instruction scheduling, branch predication, tail merging and cross jumping, machine idioms and instruction combining), vectorization, phase ordering, profile-guided optimization, and/or macro compression.

Figure 9:
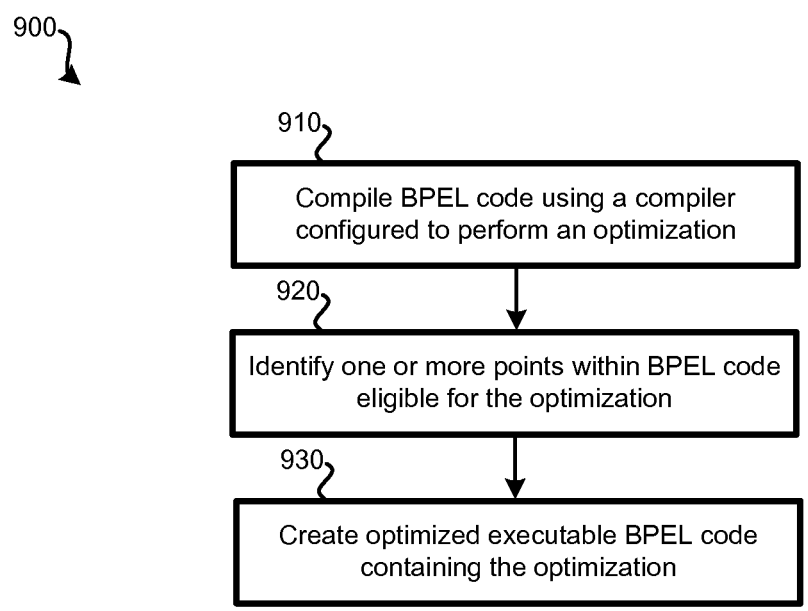
FIG. 9 illustrates an embodiment of a method for optimizing BPEL code.

FIG. 9 illustrates an embodiment of a method 900 for optimizing BPEL code. Such optimization may be used to perform at least some of the optimizations detailed above. Method 900 may be performed using one or more computer systems.

At step 910, BPEL code may be compiled using a compiler configured to perform one or more optimizations. Such optimizations may include one or more of the optimizations detailed above. At step 920, one or more points with the BPEL code being compiled may be identified that are eligible for the optimization. The identified points may be dehydration points or some other points within the BPEL code where an efficiency may be gained. Such efficiencies may include: decreasing processing time, decreasing complexity, decreasing memory usage, etc. At step 930, optimized executable BPEL code containing the optimization may be created. One or more BPEL runtime processes that are instances of the optimized executable BPEL code may be executed. As executed, the one or more optimizations may be used.

Figure 10:
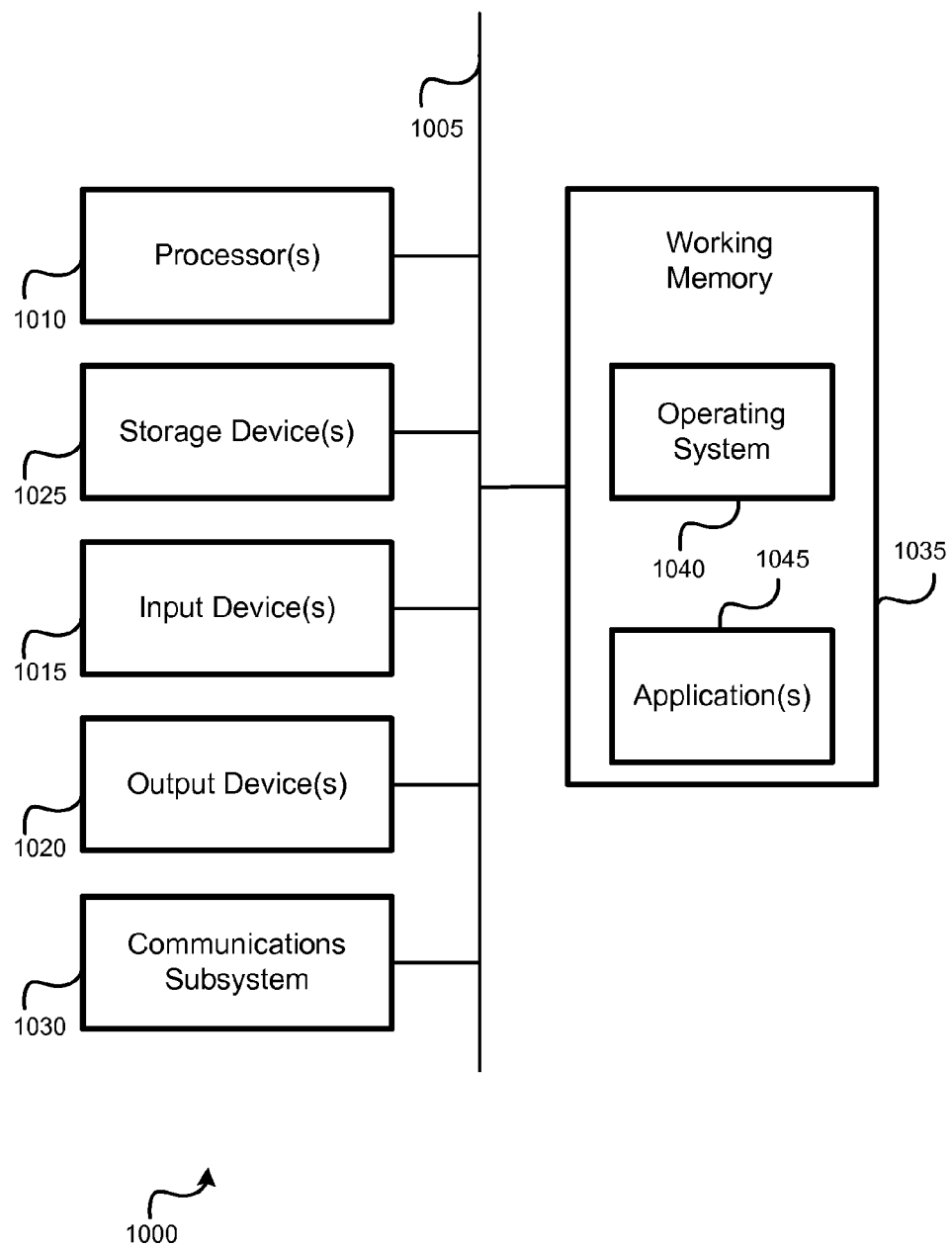
FIG. 10 illustrates an embodiment of a computer system.

FIG. 10 illustrates an embodiment of a computer system. A computer system as illustrated in FIG. 10 may be incorporated as part of the previously described systems and may be used to perform the previously described methods. For example, computer system 1000 can execute composite applications, external applications, web services, and BPEL compilers. Computer system 1000 may access storage structures, such as storage structure 320. FIG. 10 provides a schematic illustration of one embodiment of a computer system 1000 that can perform the methods provided by various embodiments, as described herein. It should be noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner.

The computer system 1000 is shown comprising hardware elements that can be electrically coupled via a bus 1005 (or may otherwise be in communication, as appropriate). The hardware elements may include one or more processors 1010, including without limitation one or more general-purpose processors and/or one or more special-purpose processors (such as digital signal processing chips, graphics acceleration processors, and/or the like); one or more input devices 1015, which can include without limitation a mouse, a keyboard, and/or the like; and one or more output devices 1020, which can include without limitation a display device, a printer, and/or the like.

The computer system 1000 may further include (and/or be in communication with) one or more non-transitory storage devices 1025, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including without limitation, various file systems, database structures, and/or the like.

The computer system 1000 might also include a communications subsystem 1030, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 1030 may permit data to be exchanged with a network (such as the network described below, to name one example), other computer systems, and/or any other devices described herein. In many embodiments, the computer system 1000 will further comprise a working memory 1035, which can include a RAM or ROM device, as described above.

The computer system 1000 also can comprise software elements, shown as being currently located within the working memory 1035, including an operating system 1040, device drivers, executable libraries, and/or other code, such as one or more application programs 1045, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1025 described above. In some cases, the storage medium might be incorporated within a computer system, such as computer system 1000. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1000) to perform methods in accordance with various embodiments of the invention. According to a set of embodiments, some or all of the procedures of such methods are performed by the computer system 1000 in response to processor 1010 executing one or more sequences of one or more instructions (which might be incorporated into the operating system 1040 and/or other code, such as an application program 1045) contained in the working memory 1035. Such instructions may be read into the working memory 1035 from another computer-readable medium, such as one or more of the storage device(s) 1025. Merely by way of example, execution of the sequences of instructions contained in the working memory 1035 might cause the processor(s) 1010 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1000, various computer-readable media might be involved in providing instructions/code to processor(s) 1010 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1025. Volatile media include, without limitation, dynamic memory, such as the working memory 1035.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1000.

The communications subsystem 1030 (and/or components thereof) generally will receive signals, and the bus 1005 then might carry the signals (and/or the data, instructions, etc. carried by the signals) to the working memory 1035, from which the processor(s) 1010 retrieves and executes the instructions. The instructions received by the working memory 1035 may optionally be stored on a non-transitory storage device 1025 either before or after execution by the processor(s) 1010.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for reducing a size of a Business Process Execution Language (BPEL) data blob for storage, the method comprising:

identifying, by a computer system, one or more dehydration points within BPEL code;

performing, by the computer system, a liveness analysis for the one or more dehydration points;

identifying, by the computer system, at each of the one or more dehydration points, one or more live variables from a set of variables;

creating, by the computer system, an optimization data structure that for each dehydration point identifies the one or more live variables;

compiling the BPEL code using a BPEL compiler configured to perform the liveness analysis, thereby creating compiled BPEL code;

executing a BPEL process using the compiled BPEL code;

dehydrating the BPEL process at a dehydration point during execution of the BPEL process using the compiled BPEL code; and identifying, using the optimization data structure, the one or more live variables for the dehydration point.

2. The method for reducing the size of the BPEL data blob for storage of claim 1, wherein at runtime, the optimization data structure is checked when the one or more dehydration points are reached such that the one or more live variables of the set of variables are stored within the BPEL data blob and one or more not-live variables of the set of variables are not stored within the BPEL data blob.

3. The method for reducing the size of the BPEL data blob for storage of claim 1, the method further comprising:

creating, by the computer system, the BPEL data blob that comprises the one or more live variables of the set of variables, but does not comprise not-live variables of the set of variables; and storing, by the computer system, the BPEL data blob.

4. The method for reducing the size of the BPEL data blob for storage of claim 1, wherein the BPEL data blob is smaller than if the BPEL data blob contained live and not-live variables.

5. The method for reducing the size of the BPEL data blob for storage of claim 1, wherein the optimization data structure is a file that comprises an indication of each variable that is live at each dehydration point of the compiled BPEL code.

6. The method for reducing the size of the BPEL data blob for storage of claim 1, wherein at least some variables of the set of variables are extensible markup language (XML) variables.

7. A method for optimizing a Business Process Execution Language (BPEL) code for execution, the method comprising:

compiling, by a computer system, the BPEL code using a BPEL compiler configured to perform an optimization;

identifying, by the computer system, one or more points within the BPEL code that are eligible for the optimization;

creating, by the computer system, optimized executable BPEL code based on the BPEL code, wherein the optimized executable BPEL code based on the BPEL code has the optimization;

executing a BPEL process using the optimized executable BPEL code;

dehydrating the BPEL process at a dehydration point during execution of the BPEL process using the optimized executable BPEL code; and identifying, using an optimization data structure, the one or more live variables for the dehydration point.

8. A computer program residing on a non-transitory processor-readable medium for reducing a size of a business-process data blob for storage, the computer program comprising computer-readable instructions configured to cause a computer to:

identify one or more dehydration points within code;

perform a liveness analysis for the one or more dehydration points;

identify at each of the one or more dehydration points, one or more live variables from a set of variables;

create an optimization data structure that for each dehydration point identifies the one or more live variables;

compile the code using a compiler configured to perform the liveness analysis, thereby creating compiled code;

execute a process using the compiled code;

dehydrate the process at a dehydration point during execution of the process using the compiled code; and identify, using the optimization data structure, the one or more live variables for the dehydration point.

9. The computer program for reducing the size of the business-process data blob of claim 8, wherein at runtime, the optimization data structure is checked when the one or more dehydration points are reached such that the one or more live variables of the set of variables are stored within the business-process data blob and one or more not-live variables of the set of variables are not stored within the business-process data blob.

10. The computer program for reducing the size of the business-process data blob of claim 8, wherein the computer program further comprises computer-readable instructions configured to cause the computer to:

create the business-process data blob that comprises the one or more live variables of the set of variables, but does not comprise not-live variables of the set of variables; and store the business-process data blob.

11. The computer program for reducing the size of the business-process data blob of claim 8, wherein the business-process data blob is smaller than if the business-process data blob contained live and not-live variables.

12. The computer program for reducing the size of the business-process data blob of claim 8, wherein the optimization data structure is a file that comprises an indication of each variable that is live at each dehydration point of the compiled code.

13. The computer program for reducing the size of the business-process data blob of claim 8, wherein at least some variables of the set of variables are extensible markup language XML variables.

14. The computer program for reducing the size of the business-process data blob of claim 8, wherein the code is business process execution language (BPEL) code.

* * * * *

UNITED STATES PATENT AND TRADEMARK OFFICE
CERTIFICATE OF CORRECTION

Page 1 of 2

PATENT NO. : 8,954,942 B2
APPLICATION NO. : 13/360127
DATED : February 10, 2015
INVENTOR(S) : Krishnamurthy It is certified that error appears in the above-identified patent and that said Letters Patent is hereby corrected as shown below:

References Cited

On page 3, column 2, under other publications, lines 3-4, delete "Stufent Guide, Edtition" and insert -- Student Guide, Edition --, therefor.

On page 4, column 1, under other publications, line 7, delete "Pubiished" and insert -- Published --, therefor.

On page 4, column 1, under other publications, line 27, delete "Indentified" and insert -- Identified --, therefor.

On page 4, column 2, under other publications, line 18, delete "Apr. 21," and insert -- Apr. 27, --, therefor.

On page 4, column 2, under other publications, line 21, after "mailed" insert -- on --.

On page 4, column 2, under other publications, line 29, after "mailed" insert -- on --.

On page 4, column 2, under other publications, line 37, after "mailed" insert -- on --.

On page 5, column 1, under other publications, line 23, after "mailed" insert -- on --.

On page 5, column 1, under other publications, line 37, delete "12/23,816" and insert -- 12/203,816 --, therefor.

Signed and Sealed this
Twenty-fourth Day of November, 2015

Michelle K. Lee
*Director of the United States Patent and Trademark Office*

CERTIFICATE OF CORRECTION (continued)
U.S. Pat. No. 8,954,942 B2

In the specification

In column 9, lines 7-8, delete "As an example of a possible content of optimization data structure 230, the following line may be present:" and insert the same on Col. 9, Line 6, after "230." as the continuation of same Paragraph.

In column 10, lines 53-58, delete "BPEL runtime process 240 that initiates rehydration of BPEL process...BPEL runtime process 240 may have been received." and insert the same on Col. 10, Line 52, after "to" as the continuation of same Paragraph.

In the claims

In column 20, line 51, in claim 13, delete "XML" and insert -- (XML) --, therefor.